United States Patent
Kim et al.

(10) Patent No.: US 12,472,803 B2
(45) Date of Patent: Nov. 18, 2025

(54) SHAFT ASSEMBLY, APPARATUS FOR SHADING WINDOW AND APPARATUS FOR LUGGAGE SCREEN OF AUTOMOBILE HAVING SHAFT ASSEMBLY

(71) Applicant: KOREA FUEL-TECH CORPORATION, Anseong-si (KR)

(72) Inventors: Bong Jung Kim, Anseong-si (KR); Jung Tae Kim, Pyeongtaek-si (KR); Myoung In Moon, Anseong-si (KR)

(73) Assignee: KOREA FUEL-TECH CORPORATION, Anseong-si (KR)

( * ) Notice: Subject to any disclaimer, the term of this patent is extended or adjusted under 35 U.S.C. 154(b) by 394 days.

(21) Appl. No.: 18/171,885

(22) Filed: Feb. 21, 2023

(65) Prior Publication Data

US 2023/0302879 A1 Sep. 28, 2023

(30) Foreign Application Priority Data

Mar. 28, 2022 (KR) .................. 10-2022-0038073

(51) Int. Cl.
*B60J 1/20* (2006.01)

(52) U.S. Cl.
CPC .......... *B60J 1/2033* (2013.01); *B60J 1/2052* (2013.01)

(58) Field of Classification Search
CPC ........ B60J 1/2033; B60J 1/2063; B60J 1/208; B60J 1/2052; B60J 1/2036; B60R 5/047; E06B 9/60; E06B 2009/725; F16H 48/10; F16H 1/32; F16H 2001/327
See application file for complete search history.

(56) References Cited

U.S. PATENT DOCUMENTS

| | | | | |
|---|---|---|---|---|
| 1,028,995 | A * | 6/1912 | Czabor | E06B 9/60 160/314 |
| 1,740,010 | A * | 12/1929 | Engelhardt | F16H 57/0482 74/332 |
| 1,885,156 | A * | 11/1932 | Thomas | F16H 61/0293 475/172 |
| 8,770,256 | B2 * | 7/2014 | Wieczorek | B60J 1/2063 160/24 |
| 10,259,295 | B2 * | 4/2019 | Watanabe | B60J 1/2033 |
| 11,028,641 | B2 * | 6/2021 | Lei | F16H 37/041 |
| 2005/0257903 | A1 * | 11/2005 | Schimko | B60J 1/208 160/370.22 |

(Continued)

FOREIGN PATENT DOCUMENTS

| JP | 2000-136684 A | 5/2000 |
|---|---|---|
| JP | 2004-137071 A | 5/2004 |

(Continued)

*Primary Examiner* — Abe Massad

(57) ABSTRACT

The shaft assembly according to an embodiment of the present disclosure includes: a shaft connected to a blind sheet; a pair of end caps each being coupled to one side and the other side of the shaft to perform the rotational movement together with the shaft; a gear unit connected to either one of the pair of end caps and has a plurality of gears to interlock with the rotational movement of the shaft; and an elastic unit connected to any one of the plurality of gears of the gear unit and providing an elastic force so that the gear unit provides a rotational driving force to the shaft between a deployed position and a retracted position of the blind sheet.

13 Claims, 30 Drawing Sheets

(56) References Cited

U.S. PATENT DOCUMENTS

| | | | | |
|---|---|---|---|---|
| 2008/0078513 | A1* | 4/2008 | Hansen | B60J 1/2058 160/370.22 |
| 2009/0283226 | A1* | 11/2009 | Cheng | E06B 9/60 160/313 |
| 2015/0308188 | A1* | 10/2015 | Lin | E06B 9/56 242/375.3 |
| 2017/0036520 | A1* | 2/2017 | Watanabe | B65H 75/425 |
| 2017/0355248 | A1* | 12/2017 | Walter | B60J 1/2044 |

FOREIGN PATENT DOCUMENTS

| | | |
|---|---|---|
| JP | 2005-329940 A | 12/2005 |
| KR | 2001-0081786 A | 8/2001 |

\* cited by examiner

FIG. 21
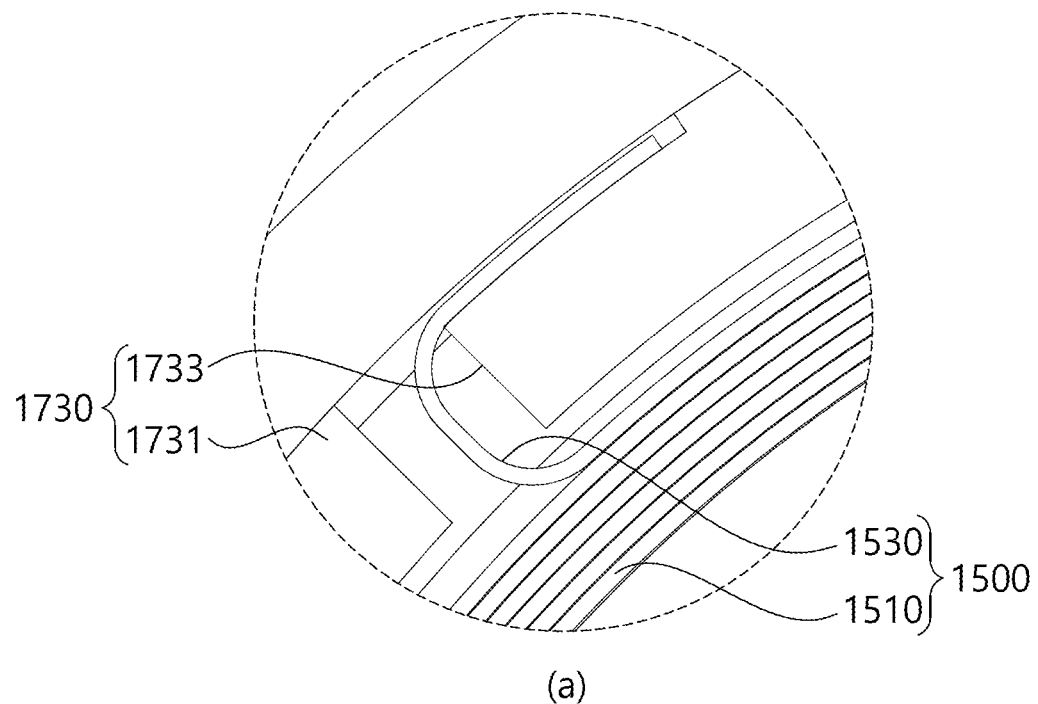
(a)
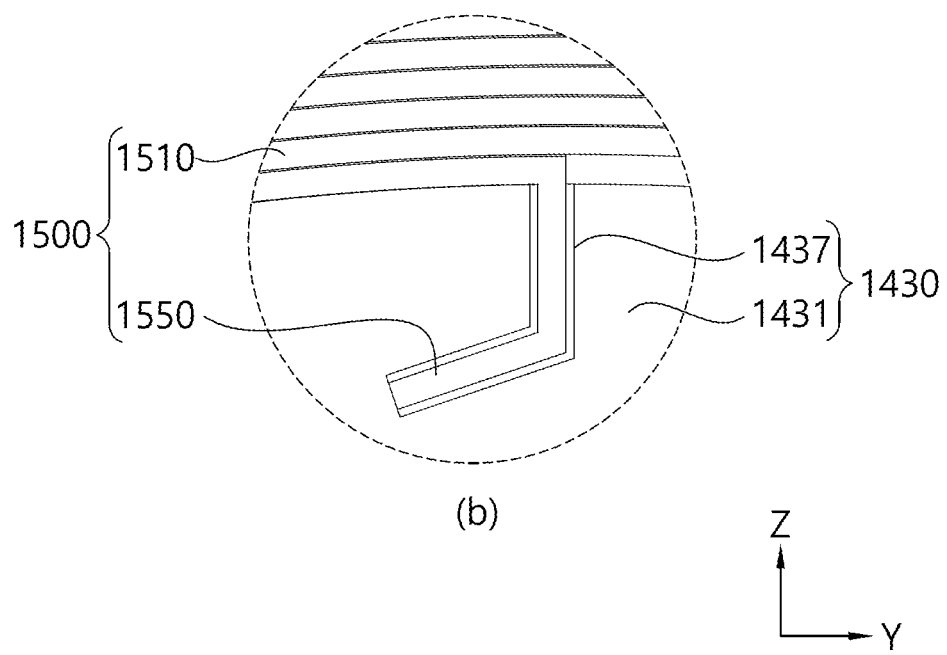
(b)

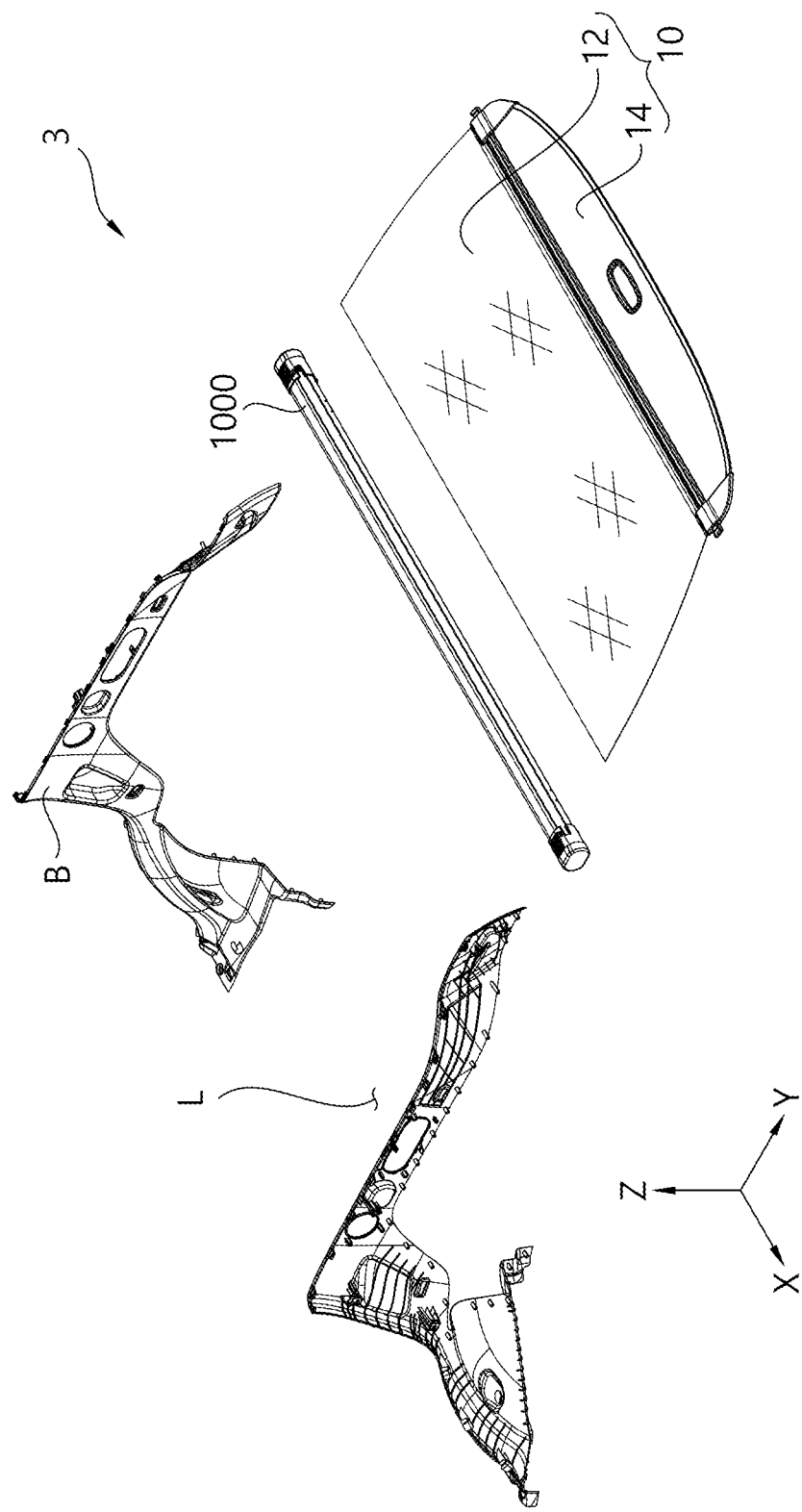

SHAFT ASSEMBLY, APPARATUS FOR SHADING WINDOW AND APPARATUS FOR LUGGAGE SCREEN OF AUTOMOBILE HAVING SHAFT ASSEMBLY

CROSS-REFERENCE TO RELATED APPLICATIONS

This application claims the benefit of Korean Patent Application No. 10-2022-0038073, filed on Mar. 28, 2022, the contents of which are all hereby incorporated by reference herein in their entirety.

BACKGROUND

Field

The present disclosure relates to a shaft assembly, an apparatus for shading a window and an apparatus for a luggage screen of an automobile having the shaft assembly, and more particularly, to a shaft assembly for selectively shading a window of an automobile and screening a cargo loading space, an apparatus for shading a window and an apparatus for luggage screen of an automobile having the shaft assembly.

Related Art

In general, an automobile includes a plurality of windows having various sizes and shapes, such as front windows, side windows, and rear windows. The front window is disposed in a region formed by a pair of A-pillars of the automobile, and the side window is disposed in a mounting region formed in a door. The rear window is disposed in a region formed by a pair of C-pillars based on a passenger car. Light passes through the windows of the automobile and is transmitted to the interior of the automobile.

Recently produced automobiles tend to be mounted with windows having a relatively large area in consideration of aesthetics such as design. For example, in accordance with the design of an automobile having a streamlined or curved shape in consideration of a design and an air resistance coefficient, the side window tends to be mounted with a window having a curved side of curvature in a basic rectangular window and a window with a larger area.

A window with a relatively large area disposed in an automobile has a benefit of improving aesthetics to an owner or users of the automobile as described above, but a large amount of light passes through the window of the automobile disposed in a relatively large area in the interior of the automobile. There are disadvantages in that the light passed through and entered through the window of the automobile is accumulated in the interior of the automobile to increase an interior temperature, and that an operation load of an air conditioning device such as an air conditioner increases in order to relieve heat accumulated in the interior due to the effect of the increased interior temperature. In addition, as it becomes easier to see the interior from the outside of the automobile through a window with a relatively large area, the vulnerability of privacy protection occurs to an owner or a user of the automobile.

In order to address the aforementioned shortcomings of excessive load of an air conditioning device due to heat accumulation in the interior of an automobile and invasion of privacy of an automobile owner and user, an apparatus for shading a window capable of mutually blocking the interior and exterior of an automobile has been developed and used.

In addition, as the leisure population increases, sports utility vehicles (SUVs) and recreational vehicles (RVs) are increasing, and sports utility vehicles and recreational vehicles have a larger cargo loading space than general passenger cars. Herein, an apparatus for a luggage screen is mounted in the cargo loading space to prevent theft of cargo loaded from the outside or to increase the usability of the cargo loading space.

An apparatus for shading a window includes a blind sheet selectively reciprocated between a deployed position that essentially covers the window and a retracted position that uncovers the window, and a shaft assembly connected to the blind sheet and performing rotational movement between the deployed position and the retracted position of the blind sheet. In addition, an apparatus for a luggage screen includes a blind sheet selectively moving between a deployed position to screen a cargo loading space and a retracted position to release a screen, and a shaft assembly connected to the blind sheet and performing rotational movement between the deployed position and the retracted position of the blind sheet. The aforementioned apparatus for shading the window and the apparatus for the luggage screen are classified into an automatic method and a manual method depending on whether a driving member of each thereof is used.

The shaft assembly used in the apparatus for shading the window and the apparatus for the luggage screen includes an elastic member for providing an elastic force to the shaft assembly so that a blind sheet in the deployed position is retracted in the retracted position.

In detail, there is an issue in that the conventional shaft assembly accommodates an elastic member inside a shaft and moves the blind sheet from the deployed position to the retracted position by using the elastic force according to the torsional deformation of the elastic member, or noise is generated during the elastic deformation and restoration of the elastic member disposed inside the shaft. Moreover, there is an issue in that the time required for a process increases along with the increase in the need for additional materials to prevent the generation of such noise.

Related Art Document

Patent Document (Patent document 1) Korean Patent Application Publication No. 2001-0081786, Electromotive Indoor Sunvisor

SUMMARY

An aspect of the present disclosure is to provide a shaft assembly with an improved structure to prevent noise generation and improve operational reliability of the shaft assembly that performs rotational movement according to the movement of a blind sheet during the reciprocating movement of the blind sheet that selectively covers a window of an automobile and/or screens a cargo loading space, an apparatus for shading a window and an apparatus for luggage screen of an automobile having the shaft assembly.

In addition, an aspect of the present disclosure is to provide a shaft assembly with an improved structure so as to reduce the time required for an assembly process while preventing noise generation and improving operational reliability of the shaft assembly, an apparatus for shading a window and an apparatus for luggage screen of an automobile having the shaft assembly.

In an embodiment of the present disclosure, there is provided a shaft assembly, including: a shaft connected to a blind sheet and performing rotational movement between a deployed position and a retracted position of the blind sheet; a pair of end caps each being coupled to one side and the other side of the shaft to perform the rotational movement together with the shaft; a gear unit connected to either one of the pair of end caps and has a plurality of gears to interlock with the rotational movement of the shaft between the retracted position and the deployed position of the blind sheet and provide the shaft with a rotational movement force between the deployed position and the retracted position of the blind sheet; and an elastic unit connected to any one of the plurality of gears of the gear unit and providing an elastic force so that the gear unit provides a rotational driving force to the shaft between the deployed position and the retracted position of the blind sheet.

The gear unit may include: a first gear connected to either one of the pair of end caps to interlock with the rotational movement of the shaft between the retracted position and the deployed position of the blind sheet and provide the shaft with the rotational movement force between the deployed position and the retracted position of the blind sheet; a ring-shaped second gear disposed with the first gear as the center at regular intervals and connected to the elastic unit to interlock with the rotational movement of the first gear and provide the rotational driving force to the first gear according to the elastic force provided from the elastic unit; and a ring-shaped third gear disposed in a space spaced apart between the first gear and the second gear and meshed with the first gear and the second gear, and performing the rotational movement so as to selectively transmit the rotational movement force provided from the first gear to the second gear and transmit the rotational movement force provided from the second gear to the first gear.

The third gear may be disposed as a planetary gear smaller in diameter than the second gear between the first gear and the second gear.

The third gear may transmit the rotational movement force according to the rotational movement of the first gear to the second gear between the retracted position and the deployed position of the blind sheet, and may transmit the rotational movement force of the second gear, which performs the rotational movement by the elastic force provided from the elastic unit, to the first gear between the deployed position and the retracted position of the blind sheet.

The first gear coupled to either one of the pair of end caps may include either one of a gear rotation axis and a gear penetration portion, and either one of the pair of end caps coupled to the first gear may include either one of an end cap penetration portion and an end cap rotation axis corresponding to either one of the gear rotation axis and the gear penetration portion and coupled to each of the gear rotation axis and the gear penetration portion.

Either one of a protrusion portion protruding from the surface and a recessed portion recessed from the surface may be formed on the gear rotation axis, and either one of a groove and a projection may be formed in the end cap penetration portion to limit a relative rotational movement between the gear rotation axis and the end cap penetration portion by being engaged with either one of the protrusion portion and the recessed portion.

Either one of the projection protruding from the surface and the groove recessed from the surface may be formed on the end cap rotation axis, and either one of the recessed portion and the protrusion portion may be formed in the gear penetration portion to limit a relative rotational movement between the end cap rotation axis and the gear penetration portion by being engaged with either one of the projection and the groove.

The shaft assembly may further include a casing that accommodates the gear unit and the elastic unit and is selectively coupled to and separated from either one of the pair of end caps.

The casing may include a first casing and a second casing that form an accommodation space of the gear unit and the elastic unit and are detachably coupled to each other. The inner surfaces of the first casing and the second casing may have a guide portion formed thereon, wherein the guide portion prevents the first gear, the second gear, and the third gear from being deviated from their respective rotational axes during the rotational movement, and guides the rotational movement of the first gear, the second gear, and the third gear.

The guide portion may include: a first guide portion for guiding the rotational movement of the first gear and limiting deviation of the first gear from a rotation axis of the first gear; a second guide portion for forming a concentric circle with the first guide portion, guiding the rotational movement of the second gear, and limiting the deviation of the second gear from the rotation axis of the second gear; and a third guide portion disposed in a separate circular shape between the first guide portion and the second guide portion, guiding the rotational movement of the third gear, and limiting the deviation of the third gear from the rotation axis of the third gear.

The elastic unit may include a spring type plate spring having one side connected to the second gear and the other side connected to the casing and elastically deformed according to the rotational movement of the second gear.

The elastic unit may be disposed between an outer circumferential surface of the second gear and an inner circumferential surface of the casing, and the second gear includes rib which extends from an outer circumferential surface toward an inner surface of the casing to limit the deviation of the elastic unit.

Both sides of the shaft may include a partially recessed notch portion, and the pair of end caps may include a notch coupling portion engaged with the notch portion to limit relative rotational movement between the end caps and the shaft.

Another aspect of the present disclosure is to provide an apparatus for shading a window of an automobile, wherein the apparatus includes: a blind sheet selectively shading the window of the automobile; and a shaft assembly for shading light having one side connected to the blind sheet to reciprocate the blind sheet between a deployed position in which the blind sheet shades the window and a retracted position that unshades the window.

In addition, the apparatus for shading a window of an automobile may further include a frame supporting the shaft assembly to either one of a door panel and a vehicle body of the automobile, and having one side supporting rotational movement of either one of a pair of end caps and the other side supporting a connection between the other one of the pair of end caps and a gear unit.

Yet another aspect of the present disclosure is to provide an apparatus for luggage screen of an automobile, wherein the apparatus includes: a blind sheet selectively screening a cargo loading space of the automobile; and a shaft assembly disposed in the cargo loading space and having one side connected to the blind sheet to reciprocate the blind sheet between a deployed position in which the blind sheet screens the cargo loading space and a retracted position in which the screen in the cargo loading space is released.

Details of other embodiments are included in the detailed description and drawings.

The shaft assembly, the apparatus for shading a window, and the apparatus for a luggage screen of an automobile having the shaft assembly according to an embodiment of the present disclosure have the following benefits.

First, the shaft can perform rotational movement according to the rotational movement of the gear unit by including the gear unit that elastically deforms the elastic unit according to the rotational movement force transmitted from the shaft when moving from the retracted position to the deployed position of the blind sheet, and providing elastic force to the gear unit when moving from the deployed position to the retracted position of the blind sheet, thereby improving the operation reliability of the shaft involved in the reciprocation of the blind sheet.

Second, unlike the conventional method of providing elastic force to the shaft by using a torsion spring between a pair of end caps disposed on both ends of the shaft, since the gear unit and the elastic unit connected to either one of the pair of end caps can provide elastic force for rotational movement of the shaft, compared to conventional torsion springs, noise generation is minimized and the use of subsidiary materials is minimized, thereby improving product satisfaction and reducing assembly process time.

BRIEF DESCRIPTION OF THE DRAWINGS

FIG. 21 is an enlarged view of region G shown in FIG. 18.

FIG. 30 is an exploded perspective view of the apparatus for a luggage screen of an automobile shown in FIG. 29.

DESCRIPTION OF EXEMPLARY EMBODIMENTS

Hereinafter, a shaft assembly, an apparatus for shading a window and an apparatus for a luggage screen of an automobile having the shaft assembly according to an embodiment of the present disclosure will be described in detail with reference to the accompanying drawings.

Prior to the description, it is clarified in advance that the shaft assembly according to the first and second embodiments of the present disclosure may be applied to rear windows and side windows of automobiles, and in particular, the shaft assembly may also be used for selective shading of a sunroof disposed with a glass material.

Figure 2:
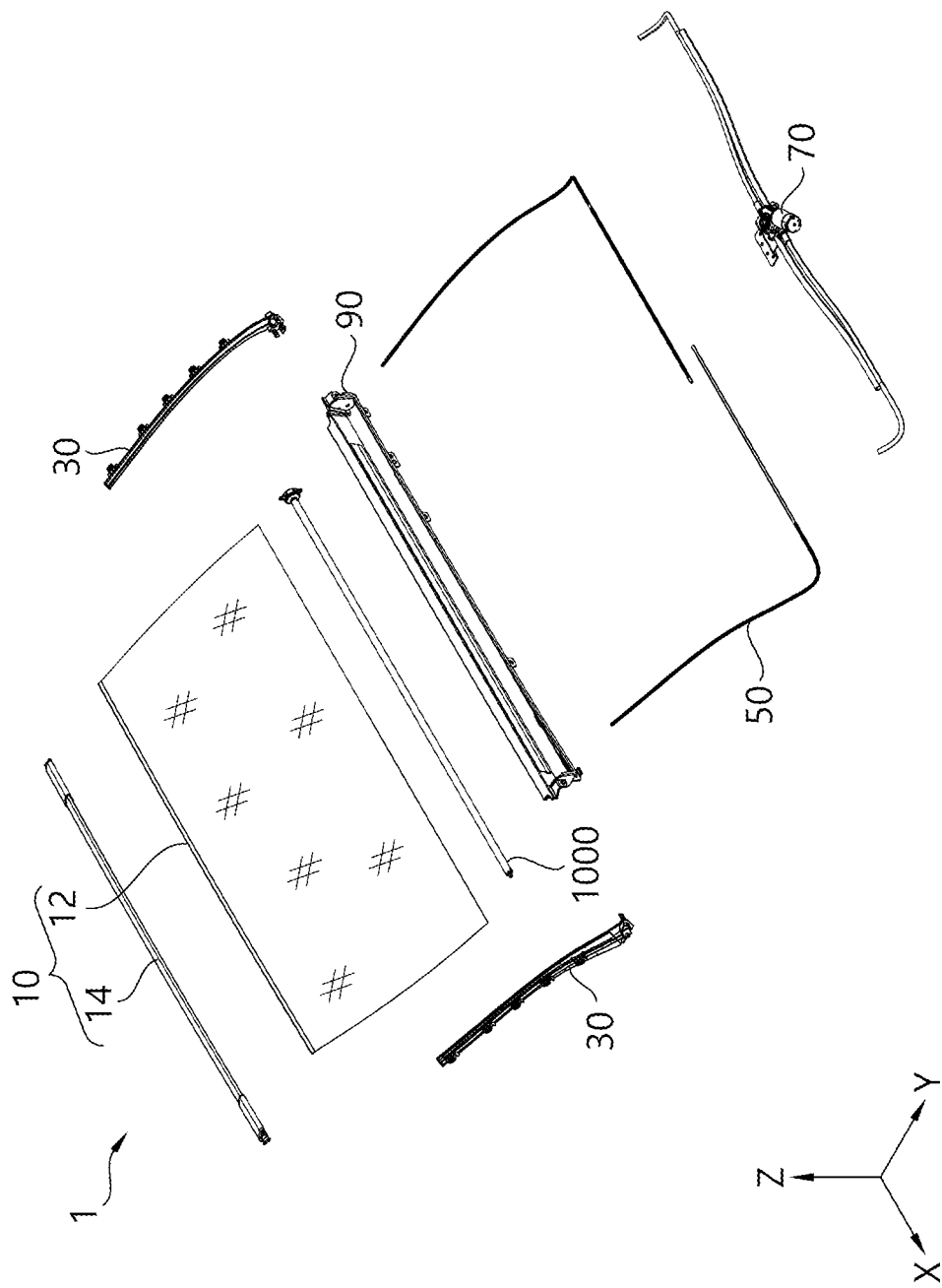
FIG. 2 is an exploded perspective view of the apparatus for shading a window of an automobile shown in FIG. 1.
Figure 3:
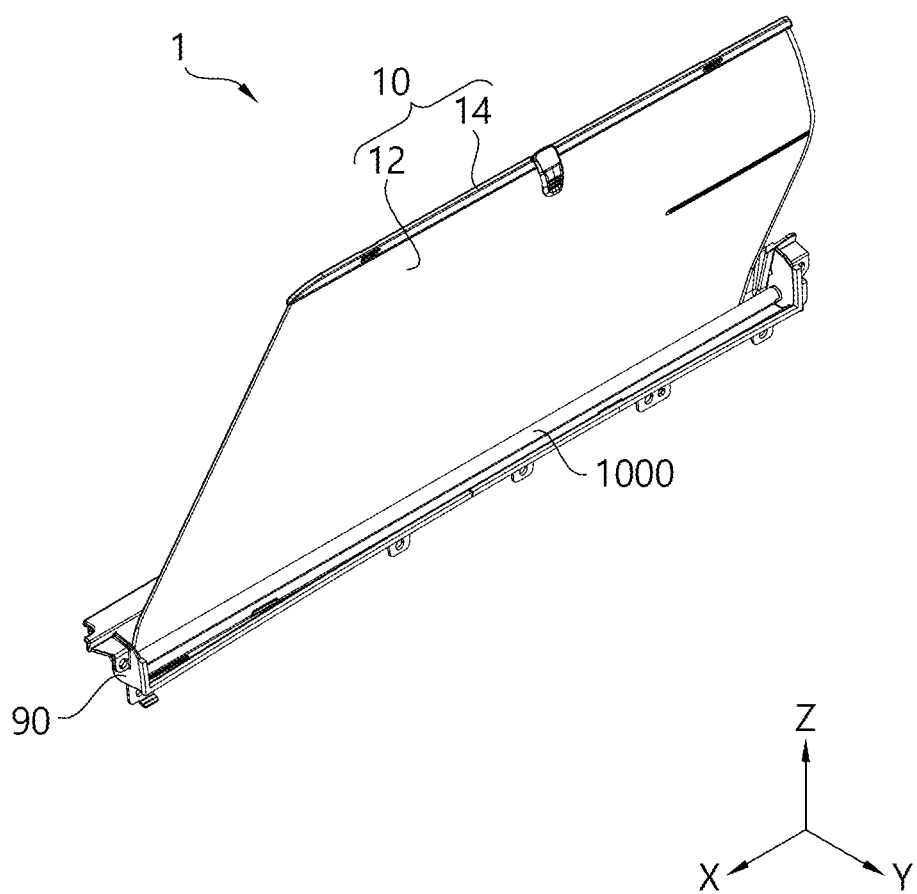
FIG. 3 is a perspective view of an apparatus for shading a window of an automobile used for a side window according to an embodiment of the present disclosure.
Figure 4:
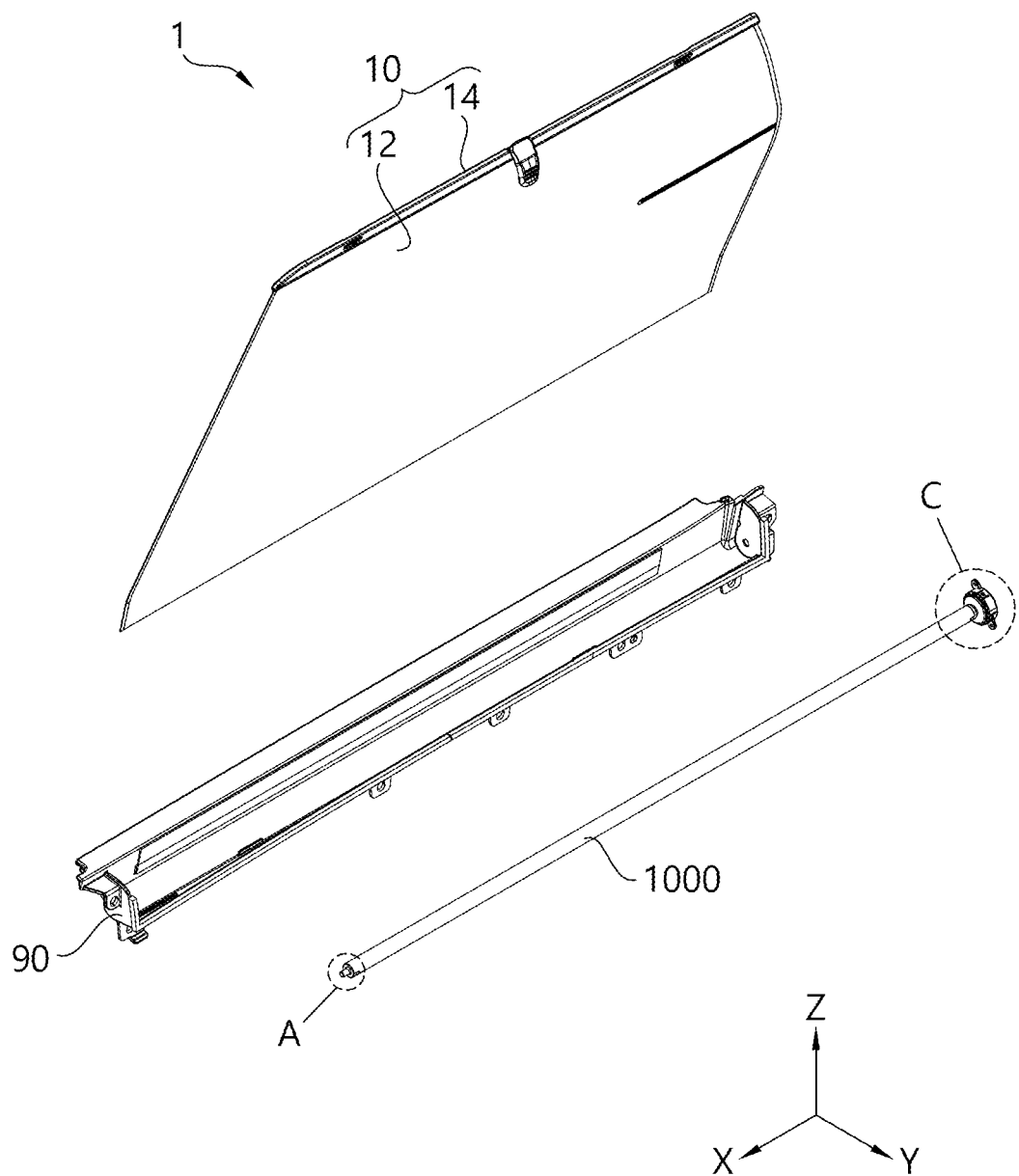
FIG. 4 is an exploded perspective view of the apparatus for shading a window of an automobile shown in FIG. 3.

In addition, it is clarified in advance that the apparatus for shading a window of an automobile according to an embodiment of the present disclosure used for the side window shown in FIGS. 3 and 4 of the present disclosure is shown and described in a manual manner, but is not limited thereto and may be used. In addition, it is clarified in advance that although FIGS. 5 to 28 have been described based on the shaft assembly shown in FIGS. 3 and 4, it is not limited thereto and has the same configuration and characteristics as the shaft assembly shown in FIGS. 1 and 2.

It is clarified in advance that the apparatus for a luggage screen of an automobile according to an embodiment of the present disclosure includes a shaft assembly used in the apparatus for shading a window of an automobile according to the first and second embodiments of the present disclosure.

In addition, it is clarified in advance that the shaft assembly included in the apparatus for shading a window of an automobile according to the first and second embodiments of the present disclosure and the shaft assembly included in the apparatus for a luggage screen of an automobile according to an embodiment of the present disclosure will be assigned with the same reference numerals for the same components.

Figure 1:
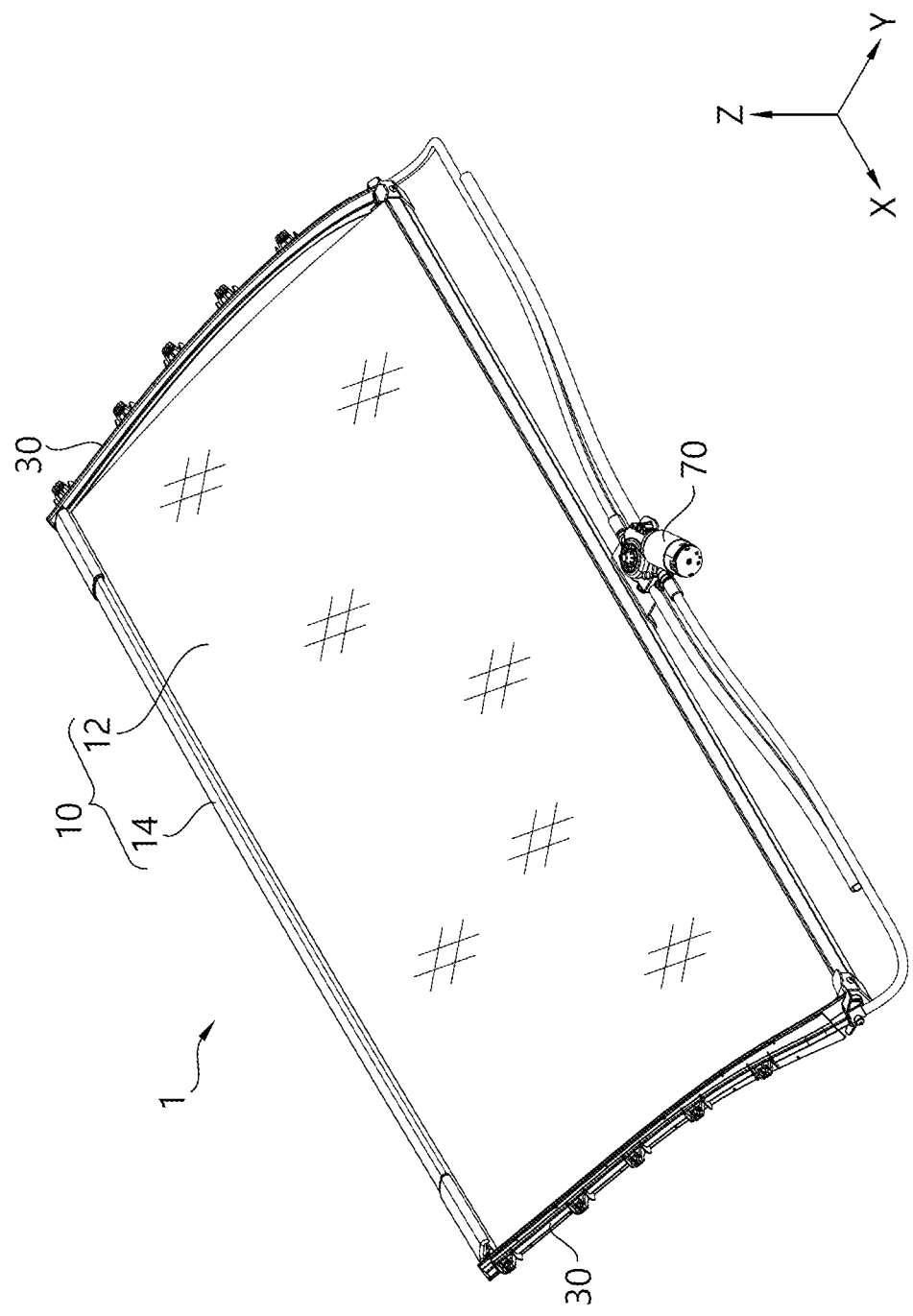
FIG. 1 is a perspective view of an apparatus for shading a window of an automobile used for a rear window according to an embodiment of the present disclosure.

FIG. 1 is a perspective view of an apparatus for shading a window of an automobile used for a rear window according to an embodiment of the present disclosure. FIG. 2 is an exploded perspective view of the apparatus for shading a window of an automobile shown in FIG. 1. FIG. 3 is a perspective view of an apparatus for shading a window of an automobile used for a side window according to an embodiment of the present disclosure. FIG. 4 is an exploded perspective view of the apparatus for shading a window of an automobile shown in FIG. 3.

As shown in FIGS. 1 and 2, an apparatus 1 for shading a window of an automobile according to an embodiment of the present disclosure includes a blind unit 10, a guide rail 30, a guide member 50, a driving portion 70, a frame 90, and a shaft assembly 1000. The apparatus 1 for shading a window of an automobile according to an embodiment of the present disclosure shown in FIGS. 1 and 2 is used to selectively shade the rear windows of an automobile.

The blind unit 10 includes a blind sheet 12 and a shade bar 14. The blind sheet 12 reciprocates between a deployed position that covers a rear window and a retracted position that uncovers the rear window. One side of the blind sheet 12 is connected to the shade bar 14, and the other side is connected to the shaft assembly 1000. The blind sheet 12 is retracted around the shaft assembly 1000 in the retracted position and is made of a fabric material such as fabric having low light transmittance so that the blind sheet 12 may be deployed in the deployed position.

The shade bar 14 is connected to one side of the blind sheet 12. The shade bar 14 pulls the blind sheet 12 from a retracted position to a deployed position by driving the guide member 50 and the driving portion 70.

A guide rail 30 forms a guide path of the guide member 50 moved by the driving force of the driving portion 70. The guide rail 30 is disposed on both sides of the blind sheet 12 in the transverse direction of the moving direction of the blind sheet 12.

As shown in FIGS. 3 and 4, the apparatus 1 for shading a window of an automobile according to an embodiment of the present disclosure includes the blind unit 10, the frame 90, and the shaft assembly 1000. The apparatus 1 for shading a window of an automobile according to an embodiment of the present disclosure shown in FIGS. 3 and 4 is used to selectively shield side windows of a vehicle, that is, door windows. The apparatus 1 for shading a window of an automobile according to an embodiment of the present disclosure shown in FIGS. 3 and 4 operates in a manual manner, but the design may be changed in an automatic manner.

The blind unit 10 includes the blind sheet 12 and the shade bar 14. The blind sheet 12 reciprocates between a deployed position that covers a door window and a retracted position that uncovers the door window. One side of the blind sheet 12 is connected to the shade bar 14, and the other side is connected to the shaft assembly 1000. The blind sheet 12 is retracted around the shaft assembly 1000 in the retracted position and is made of a fabric material such as fabric having low light transmittance so that the blind sheet 12 may be deployed in the deployed position.

The shade bar 14 is connected to one side of the blind sheet 12. As shown in FIGS. 3 and 4, the shade bar 14 manually pulls the blind sheet 12 from a retracted position to a deployed position by a user.

The frame 90 shown in FIGS. 1 to 4 supports the shaft assembly 1000 to either one of a door panel or a vehicle body B of an automobile. One side of the frame 90 supports the rotational movement of either one of a pair of end caps 1200 (see FIG. 5) to be described later, and the other side supports the connection between the other one of the pair of end caps 1200 and a gear unit 1400 (see FIG. 13).

First Embodiment

Figure 5:
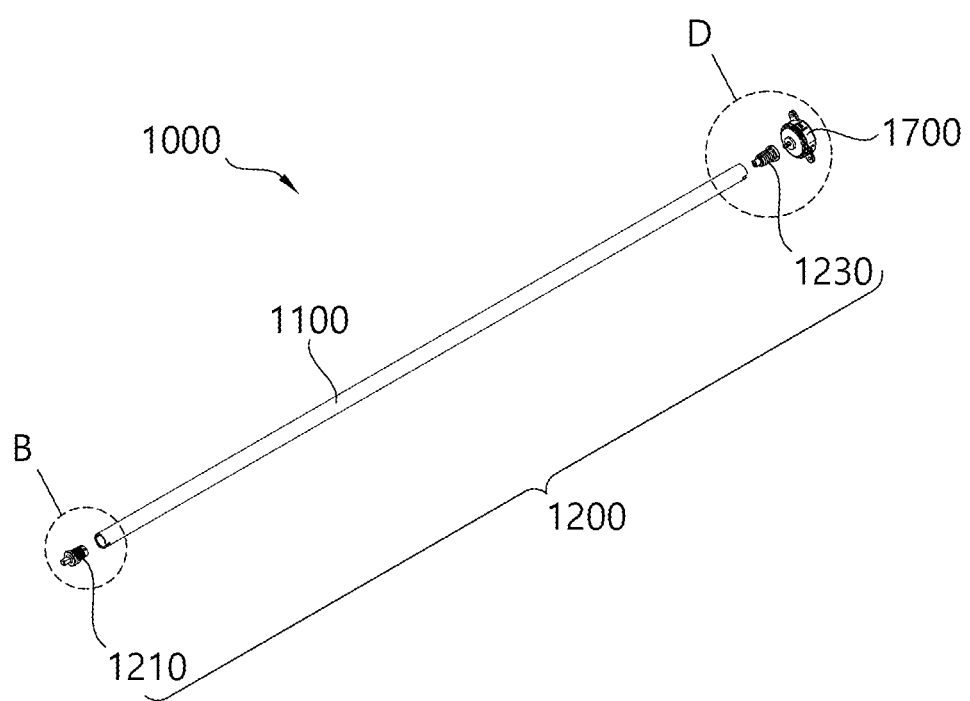
FIG. 5 is an exploded perspective view of a shaft assembly according to the first embodiment of the present disclosure shown in FIGS. 1 to 4.
Figure 6:
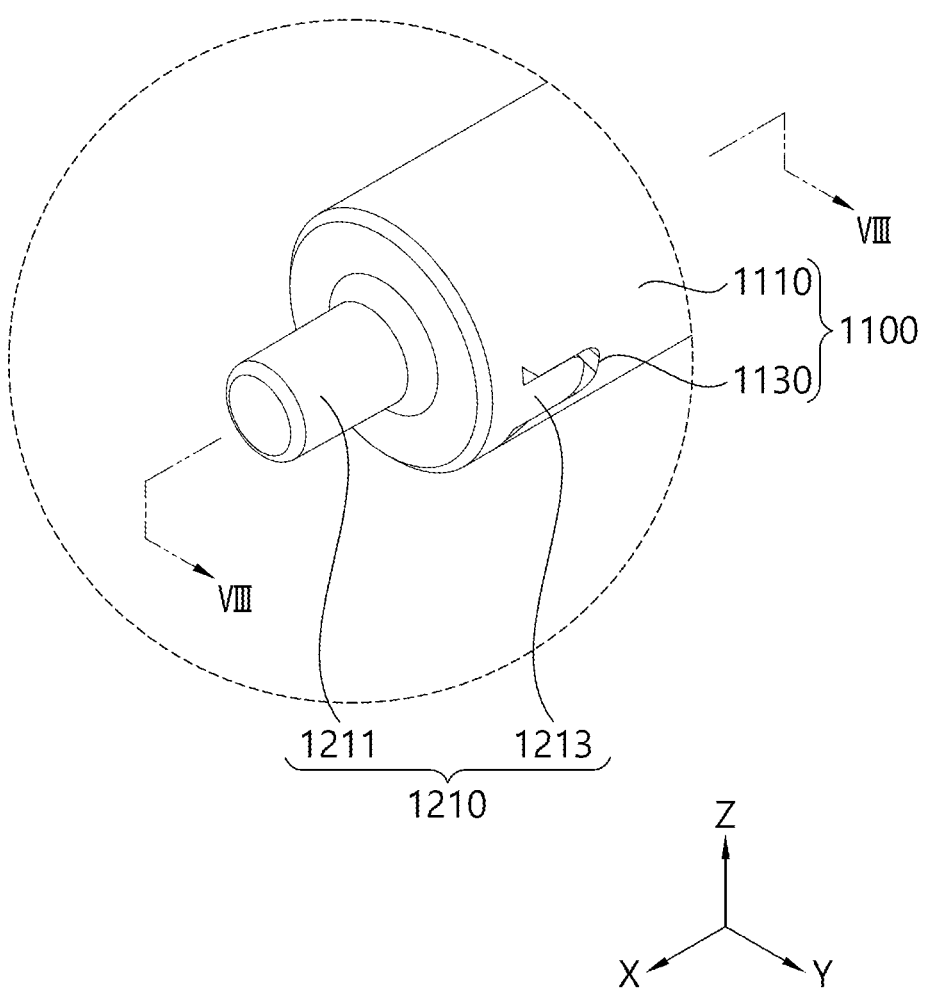
FIG. 6 is an enlarged view of region A shown in FIG. 4.
Figure 7:
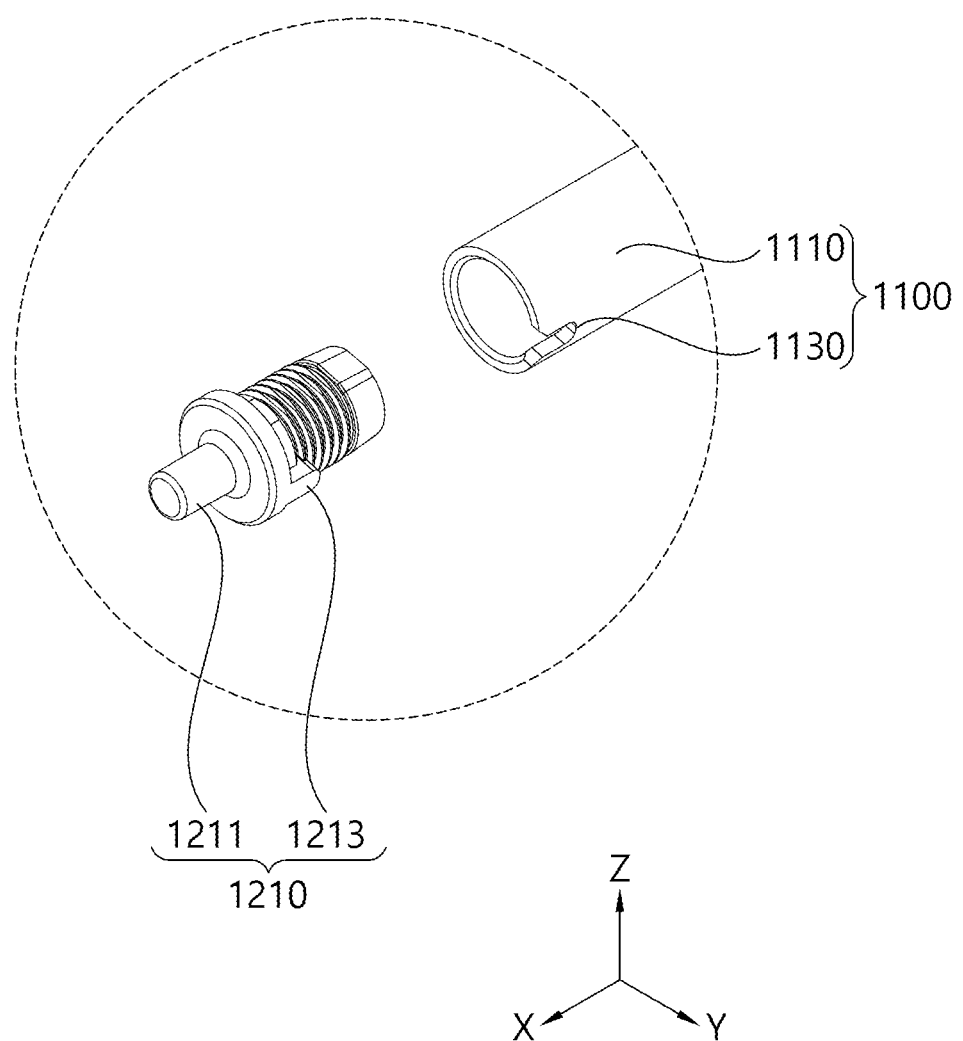
FIG. 7 is an enlarged view of region B shown in FIG. 5.
Figure 8:
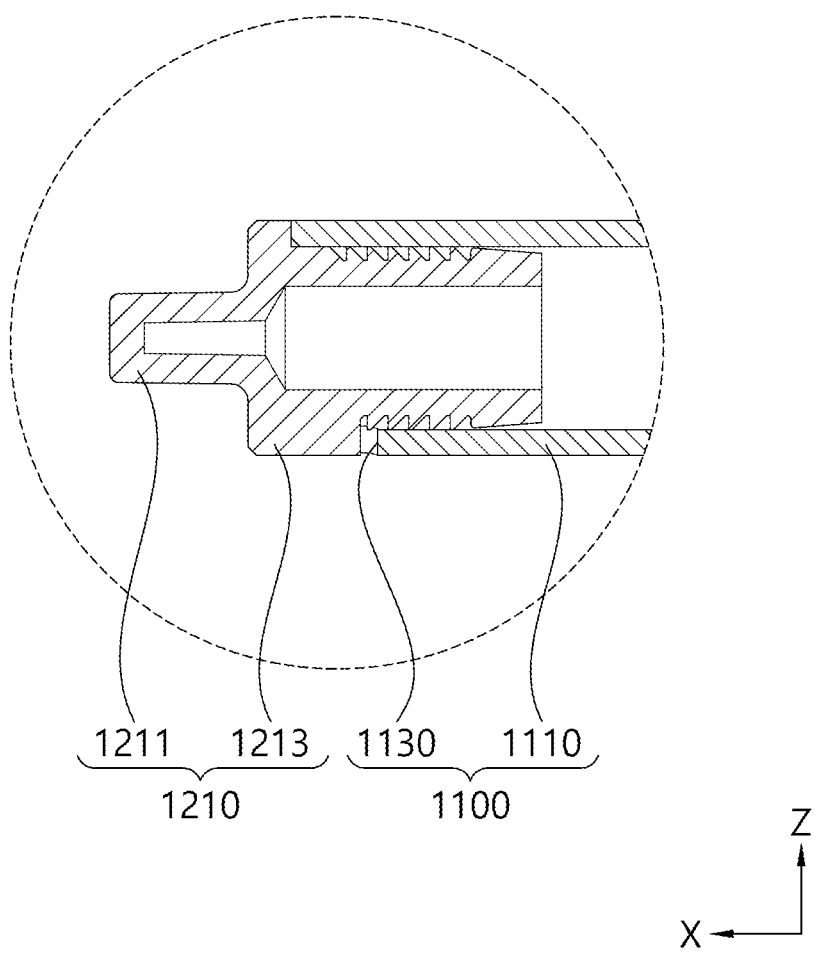
FIG. 8 is a cross-sectional view along line VIII-VIII shown in FIG. 6.
Figure 9:
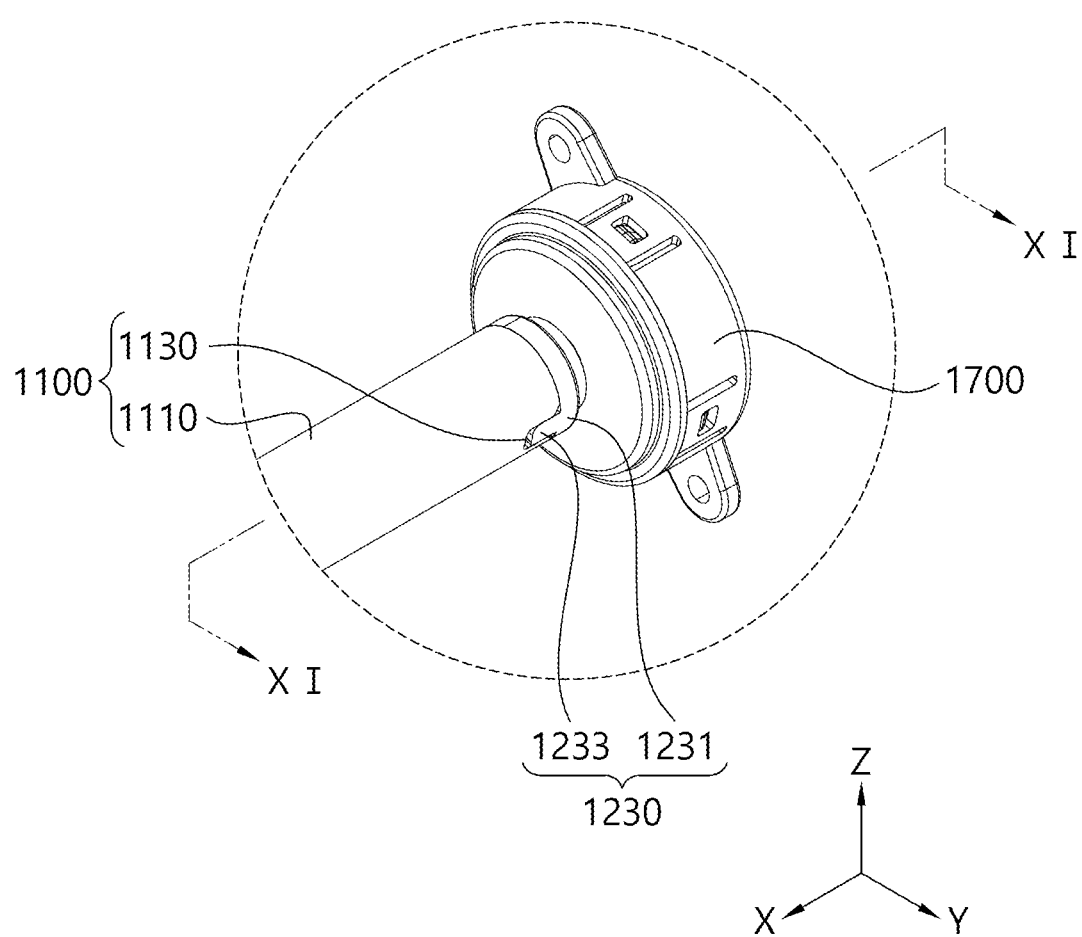
FIG. 9 is an enlarged view of region C shown in FIG. 4.
Figure 10:
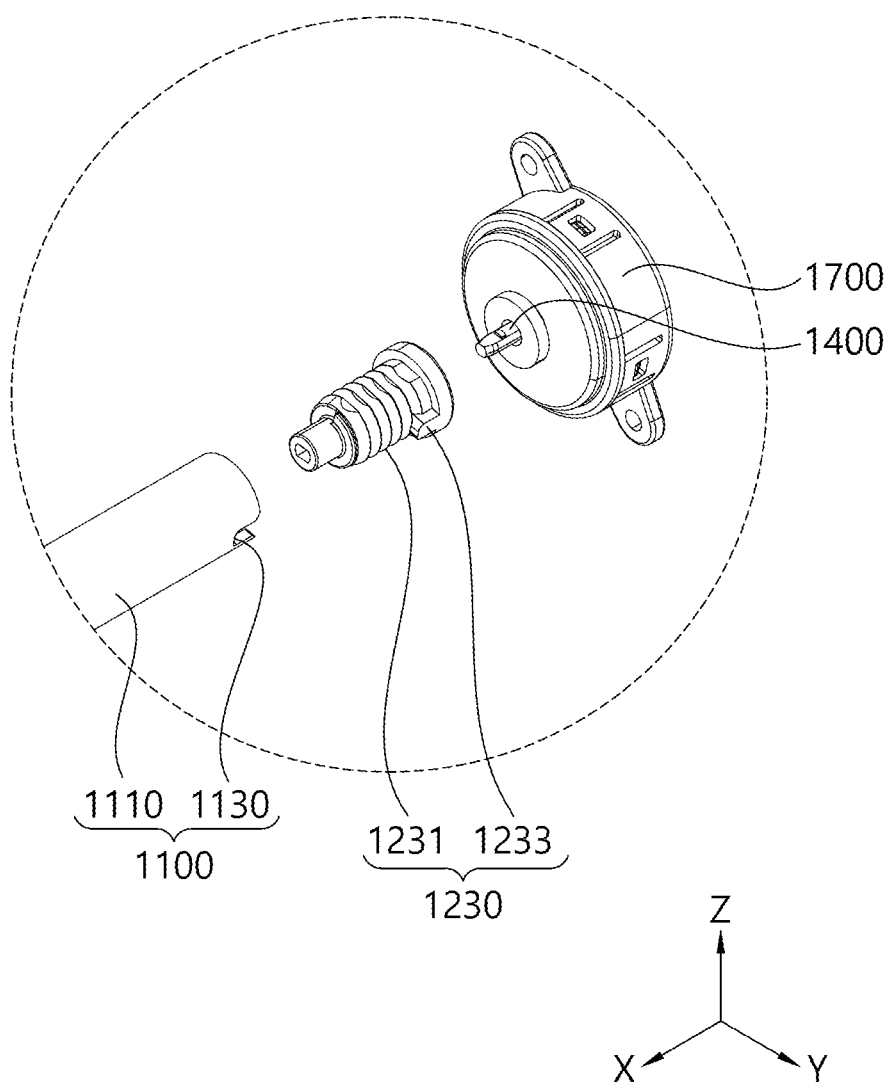
FIG. 10 is an enlarged view of region D shown in FIG. 5.
Figure 11:
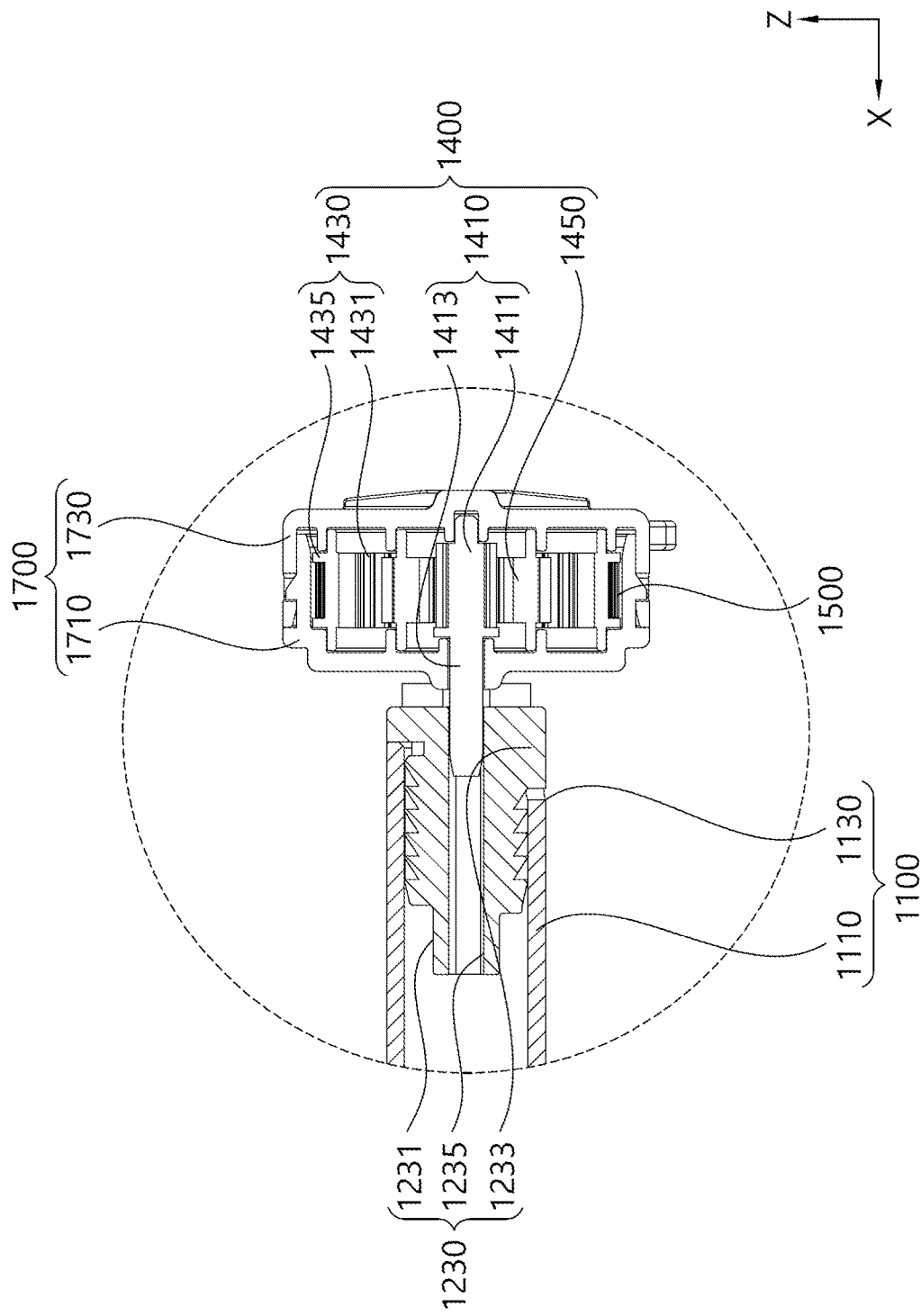
FIG. 11 is a cross-sectional view along line XI-XI shown in FIG. 9.
Figure 12:
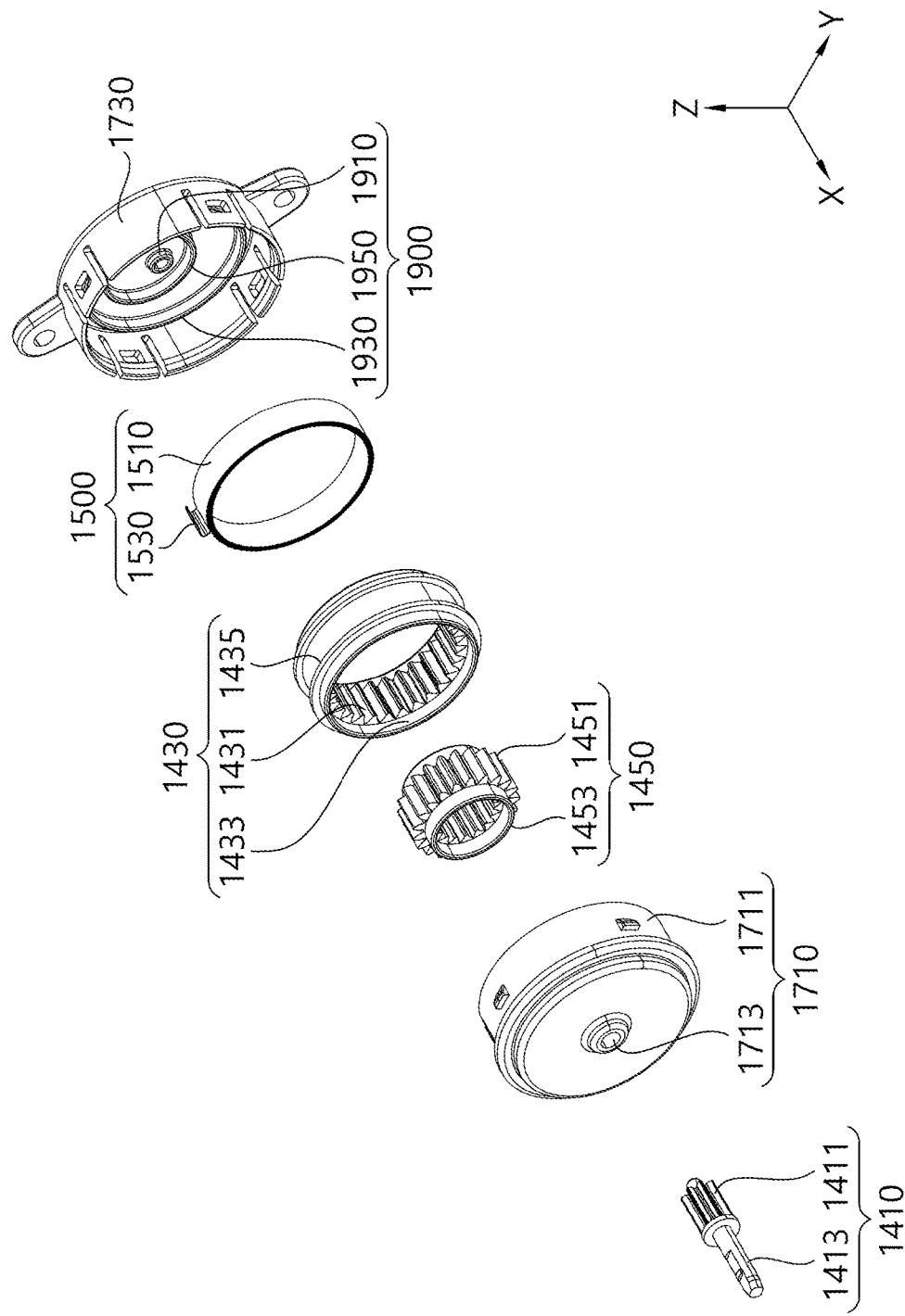
FIG. 12 is a partial exploded view (gear unit, elastic unit and casing) of the shaft assembly according to the first embodiment of the present disclosure.
Figure 13:
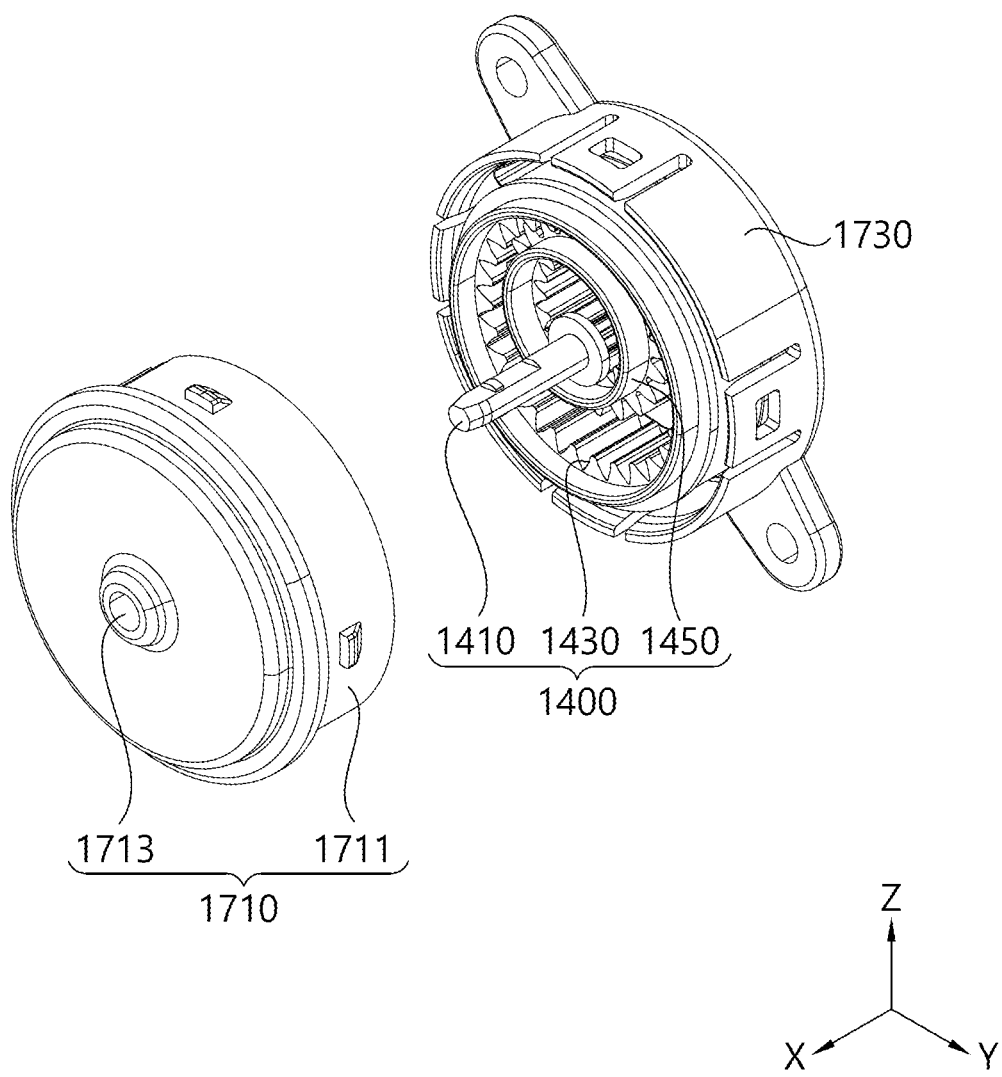
FIG. 13 is a perspective view in which the gear unit and the elastic unit shown in FIG. 12 are accommodated in a second casing and the first casing is disassembled.
Figure 14:
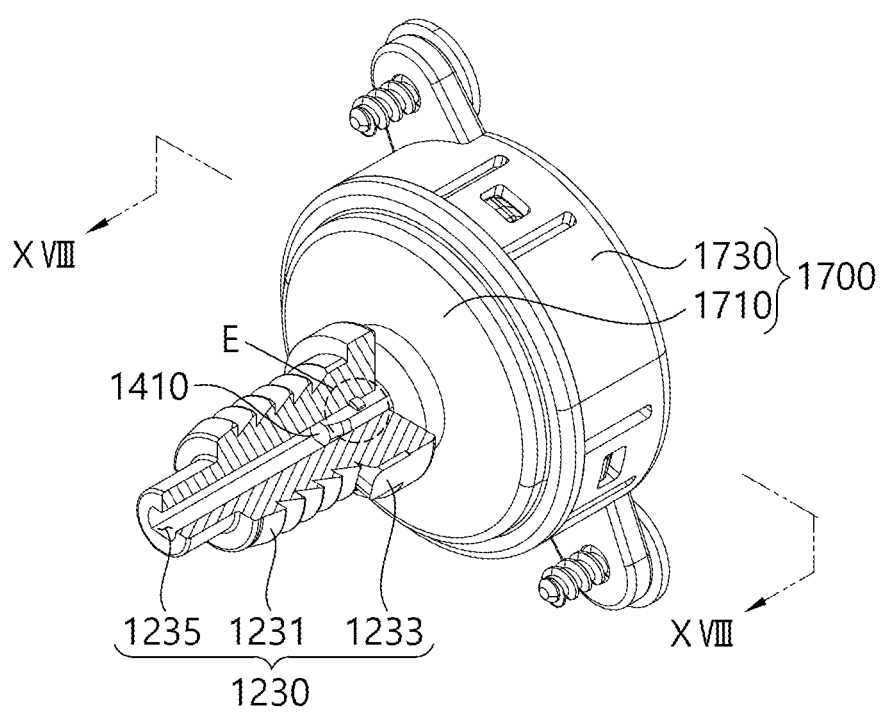
FIG. 14 is a cutaway perspective view in which a second end cap and a gear unit of the shaft assembly according to the first embodiment of the present disclosure are coupled.
Figure 15:
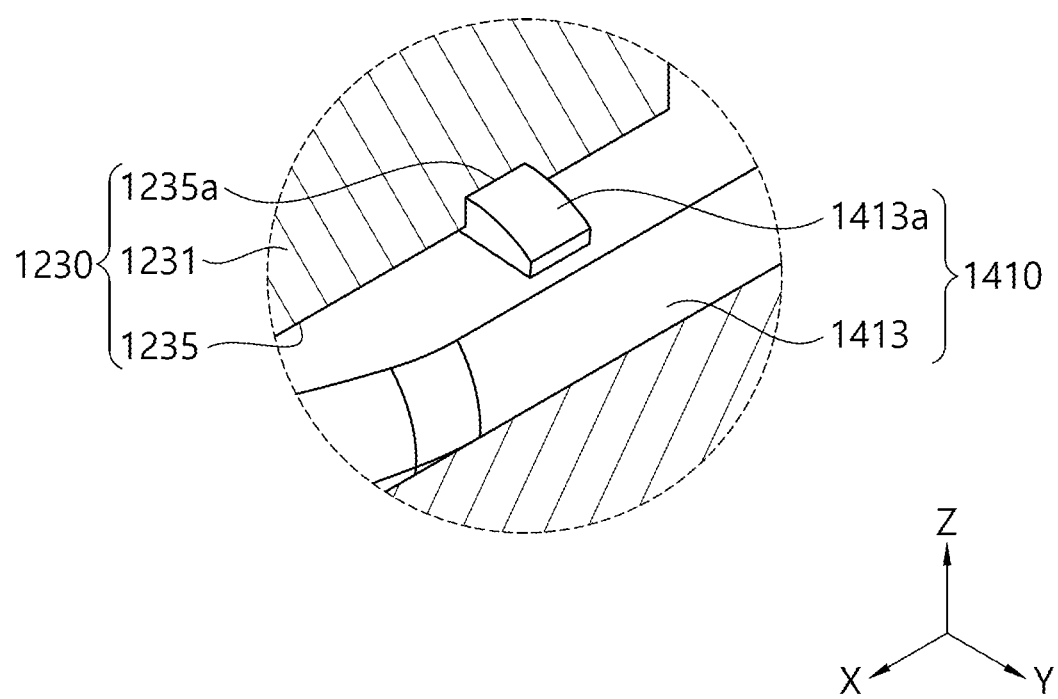
FIG. 15 is an enlarged view of region E shown in FIG. 14.
Figure 16:
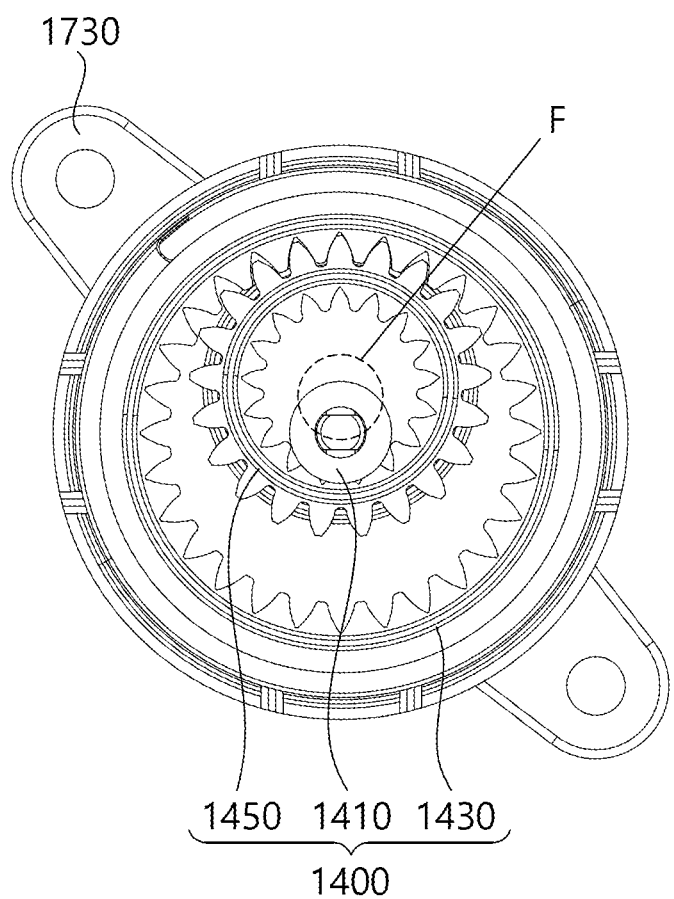
FIG. 16 is a front view of a gear unit and an elastic unit accommodated in the second casing shown in FIG. 13.
Figure 17:
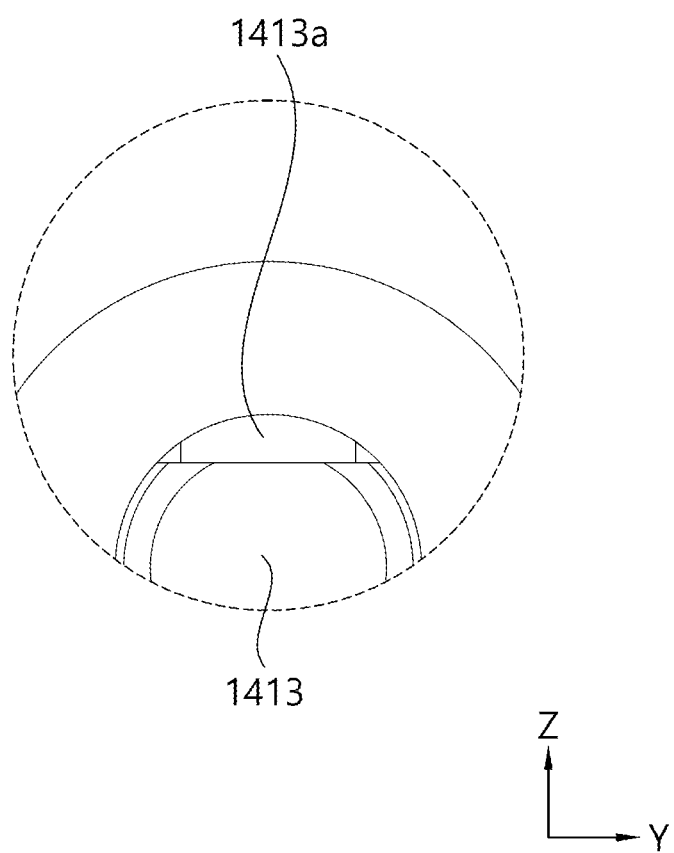
FIG. 17 is an enlarged view of region F shown in FIG. 16.

FIG. 5 is an exploded perspective view of a shaft assembly according to the first embodiment of the present disclosure shown in FIGS. 1 to 4. FIG. 6 is an enlarged view of region A shown in FIG. 4. FIG. 7 is an enlarged view of region B shown in FIG. 5. FIG. 8 is a cross-sectional view along line VIII-VIII shown in FIG. 6. FIG. 9 is an enlarged view of region C shown in FIG. 4. FIG. 10 is an enlarged view of region D shown in FIG. 5. FIG. 11 is a cross-sectional view along line XI-XI shown in FIG. 9. FIG. 12 is a partial exploded view (gear unit, elastic unit and casing) of the shaft assembly according to the first embodiment of the present disclosure. FIG. 13 is a perspective view in which the gear unit and the elastic unit shown in FIG. 12 are accommodated in a second casing and the first casing is disassembled. FIG. 14 is a cutaway perspective view in which a second end cap and a gear unit of the shaft assembly according to the first embodiment of the present disclosure are coupled. FIG. 15 is an enlarged view of region E shown in FIG. 14. FIG. 16 is a front view of a gear unit and an elastic unit accommodated in the second casing shown in FIG. 13. FIG. 17 is an enlarged view of region F shown in FIG. 16.

As shown in FIGS. 5 to 17, the shaft assembly 1000 according to the first embodiment of the present disclosure includes a shaft 1100, the pair of end caps 1200, the gear unit 1400, and an elastic unit 1500. In addition, the shaft assembly 1000 according to the first embodiment of the present disclosure further includes a casing 1700 and a guide portion 1900. The shaft assembly 1000 according to the first embodiment of the present disclosure may be used for the apparatus 1 for shading a window of an automobile used for the rear window shown in FIGS. 1 and 2 and the apparatus 1 for shading a window of an automobile used for the side window shown in FIGS. 3 and 4. In addition, it should be noted that the shaft assembly 1000 according to the first embodiment of the present disclosure may be applied to the apparatus 1 for shading a window of an automobile that automatically and manually reciprocates the blind sheet 12.

The shaft 1100 is connected to the blind sheet 12 that selectively shades a window, and performs rotational movement between a deployed position and a retracted position of the blind sheet 12. In an embodiment of the present disclosure, the shaft 1100 includes a shaft body 1110 and a notch portion 1130.

The shaft body 1110 is connected to one side of the blind sheet 12. The shaft body 1110 performs rotational movement based on the movement of the blind sheet 12 or based on the driving force provided from the gear unit 1400. For example, the shaft body 1110 performs rotational movement according to the movement of the blind sheet 12 when the blind sheet 12 moves from a retracted position to a deployed position that shades a window. When the blind sheet 12 moves from the deployed position to the retracted position, the shaft body 1110 performs rotational movement when a rotational driving force is provided from the gear unit 1400 by the elastic force provided from the elastic unit 1500. In other words, the shaft body 1110 performs rotational movement when the rotational driving force is provided from the gear unit 1400 to move the blind sheet 12 from the deployed position to the retracted position. The shaft body 1110 has a cylindrical shape with both sides open and having a length corresponding to the width of the blind sheet 12.

The notch portion 1130 is recessed from both ends of the shaft body 1110 to be engaged with a first notch coupling portion 1213 of a first end cap 1210 and a second notch coupling portion 1233 of a second end cap 1230 configured as a pair, which will be described later. Each of the notch portions 1130 formed at both ends of the shaft body 1110 engage with the first notch coupling portion 1213 and the second notch coupling portion 1233 to limit relative rotational movement of the shaft body 1110 and the pair of end caps 1200. Herein, the notch portion 1130, the first notch coupling portion 1213, and the second notch coupling portion 1233 are provided in various shapes according to design changes.

The pair of end caps 1200 include a first end cap 1210 and a second end cap 1230 coupled to each of both ends of the shaft 1100. The first end cap 1210 and the second end cap 1230 performs rotational movement together with the shaft 1100. Either one of the pair of end caps 1200 is coupled to the gear unit 1400. In an embodiment of the present disclosure, among the pair of end caps 1200, the end cap 1200 coupled to the gear unit 1400 is the second end cap 1230, but is not limited thereto and may be replaced with the first end cap 1210. In an embodiment of the present disclosure, for convenience of explanation, the end cap 1200 coupled to the gear unit 1400 is defined as the second end cap 1230.

The first end cap 1210 is coupled to one end of the shaft 1100 without being coupled to the gear unit 1400. The first end cap 1210 includes a first cap body 1211 and a first notch coupling portion 1213. One side of the first cap body 1211 is rotatably supported by the frame 90 and the other side is inserted into and coupled to the shaft 1100. The first notch coupling portion 1213 is coupled to the notch portion 1130 to limit relative rotational movement between the shaft 1100 and the first end cap 1210.

In an embodiment of the present disclosure, the second end cap 1230 includes a second cap body 1231, a second notch coupling portion 1233, and an end cap penetration portion 1235. Herein, the end cap penetration portion 1235 of the second end cap 1230 is formed to be coupled with a gear rotation axis 1413 of a first gear 1410 to be described later, but the second end cap 1230 may include an end cap rotation axis corresponding to an unshown gear penetration portion of the first gear 1410. In other words, the second end cap 1230 may include the end cap penetration portion 1235 when the first gear 1410 has the gear rotation axis 1413, and may include the end cap rotation axis when the first gear 1410 has the gear penetration portion. In detail, the end cap penetration portion 1235 of the second end cap 1230 and the end cap rotation axis may correspond to the first gear 1410 and be used alternately.

In the first embodiment of the present disclosure, a groove 1235a is formed in the end cap penetration portion 1235. The groove 1235a formed in the end cap penetration portion 1235 engages with a protrusion portion 1413a of the first gear 1410 to be described later, thereby limiting relative rotational movement between the end cap penetration portion 1235 and the first gear 1410.

Next, the gear unit 1400 is connected to either one of the pair of end caps 1200. The gear unit 1400 includes a plurality of gears to interlock with the rotational movement of the shaft 1100 between a retracted position and a deployed position of the blind sheet 12 and provide a rotational movement force to the shaft 1100 between the deployed position and the retracted position of the blind sheet 12. In an embodiment of the present disclosure, the gear unit 1400 is coupled to the second end cap 1230. The gear unit 1400 includes the first gear 1410, a second gear 1430, and a third gear 1450.

The first gear 1410 is connected to either one of the pair of end caps 1200. In an embodiment of the present disclosure, the first gear 1410 is coupled to the second end cap 1230 of the pair of end caps 1200. The first gear 1410 interlocks with the rotational movement of the shaft 1100 between a retracted position and a deployed position of the blind sheet 12 and provides a rotational movement force to the shaft 1100 between the deployed position and the retracted position of the blind sheet 12. The first gear 1410 includes a first gear body 1411 and the gear rotation axis 1413.

The first gear body 1411 is meshed with the third gear 1450. Gear teeth meshed with the third gear 1450 of the first gear body 1411 are formed along a circumference of an outer circumferential surface. The first gear body 1411 is prevented from being deviated from a rotation axis of the first gear body 1411 by a first guide portion 1910 of a guide portion 1900 to be described later.

In an embodiment of the present disclosure, the gear rotation axis 1413 is provided to be inserted into and coupled to the end cap penetration portion 1235. Herein, the gear rotation axis 1413 may be formed as an unshown gear penetration portion and coupled to an unshown end cap rotation axis. In other words, rotation axes and penetration portions may be alternately formed in the second end cap 1230 and the first gear 1410.

The gear rotation axis 1413 includes the protrusion portion 1413a that protrudes from the surface and engages the groove 1235a of the end cap penetration portion 1235 to limit relative rotational movement between the second end cap 1230 and the first gear 1410. In detail, the protrusion portion 1413a of the first gear 1410 serves as a key to limit relative rotational movement between the second end cap 1230 and the first gear 1410.

The second gear 1430 has a ring shape, is disposed at regular intervals with the first gear 1410 as the center, and is connected to the elastic unit 1500. The second gear 1430 interlocks with the rotational movement of the first gear 1410 and provides rotational driving force to the first gear 1410 according to the elastic force provided from the elastic unit 1500. The second gear 1430 includes the first gear body 1411, a second gear rotation support portion 1433, and a rib 1435.

A second gear body 1431 forms the gear teeth on its inner surface to mesh with the third gear 1450. A second gear rotation support portion 1433 protrudes from both sides of the second gear body 1431 along the direction of a rotation axis and is rotationally supported by a second guide portion 1930. The second gear rotation support portion 1433 is rotationally supported by the second guide portion 1930 to limit the deviation of the second gear body 1431 from a rotation axis of the second gear body 1431. The rib 1435 extends from an outer circumferential surface toward an inner surface of the casing 1700 to limit the deviation of the elastic unit 1500. The rib 1435 limits deviation or eccentric movement of an elastic unit 1500 between an outer circumferential surface of the second gear 1430 and the casing 1700 when the elastic unit 1500 is elastically deformed according to the rotational movement of the second gear 1430.

In addition, the second gear 1430 further includes a gear hooking portion 1437 (see FIG. 21). The gear hooking portion 1437 is connected to a second connection portion 1550 (see FIG. 21) of the elastic unit 1500. The gear hooking portion 1437 induces elastic deformation of the elastic unit 1500 between a retracted position and a deployed position of the blind sheet 12, and provides an elastic force from the elastic unit 1500 to the second gear between the deployed position and the retracted position of the blind sheet 12. Herein, the gear hooking portion 1437 is formed to correspond to the shape of a second connection portion 1530 of the elastic unit 1500.

The third gear 1450 has a ring shape, is disposed in a space spaced apart between the first gear 1410 and the second gear 1430, and meshes with the first gear 1410 and the second gear 1430. The third gear 1450 performs rotational movement to selectively transmit a rotational movement force provided from the first gear 1410 to the second gear 1430 and to transmit a rotational movement force provided from the second gear 1430 to the first gear 1410. In detail, when the first gear 1410 and the second gear 1430 are referred to as sun gears, the third gear 1450 is disposed as a planetary gear disposed between two sun gears. The third gear 1450 transmits a rotational driving force of the first gear 1410 to the second gear 1430 between a retracted position and a deployed position of the blind sheet 12, and transmits a rotational driving force of the second gear 1430, which performs rotational movement by the elastic force provided from the elastic unit 1500, to the first gear 1410 between the deployed position and the retracted position of the blind sheet 12.

The third gear 1450 includes a third gear body 1451 and a third gear rotation support portion 1453. The third gear body 1451 is meshed with the first gear 1410 and is meshed with the second gear 1430 between the first gear 1410 and the second gear 1430. Gear teeth meshing with the first gear 1410 are formed on an inner circumferential surface of the third gear body 1451, and gear teeth meshing with the second gear 1430 are formed on an outer circumferential surface. The third gear rotation support portion 1453 is rotationally supported by a third guide portion 1950. The third gear rotation support portion 1453 is rotationally supported by the third guide portion 1950 and limits the deviation of the third gear body 1451 from a rotation axis of the third gear body 1451.

Figure 18:
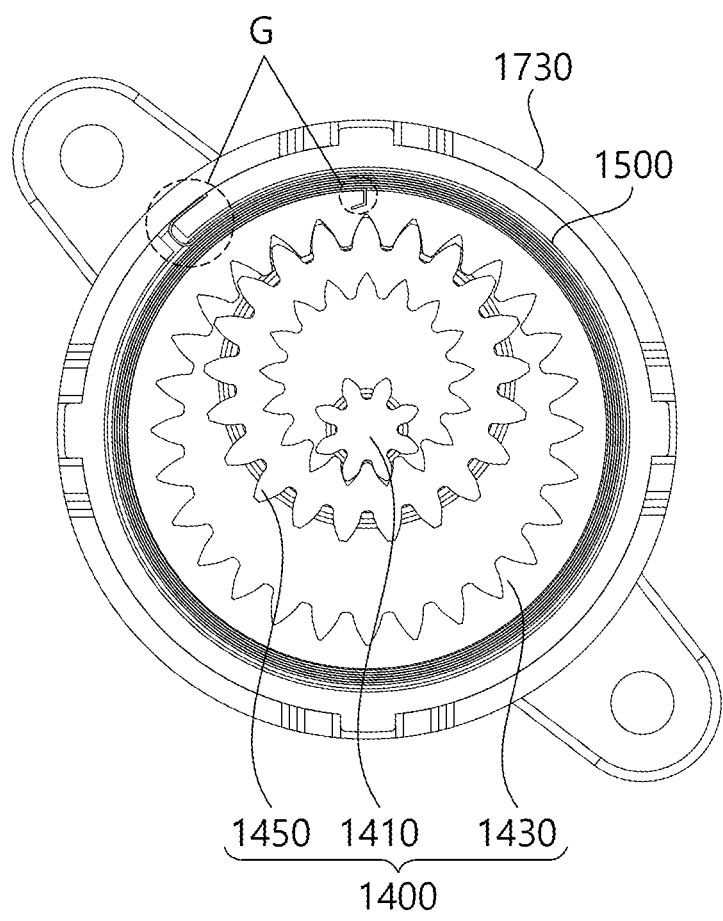
FIG. 18 is a cross-sectional view along line XVIII-XVIII shown in FIG. 14.
Figure 19:
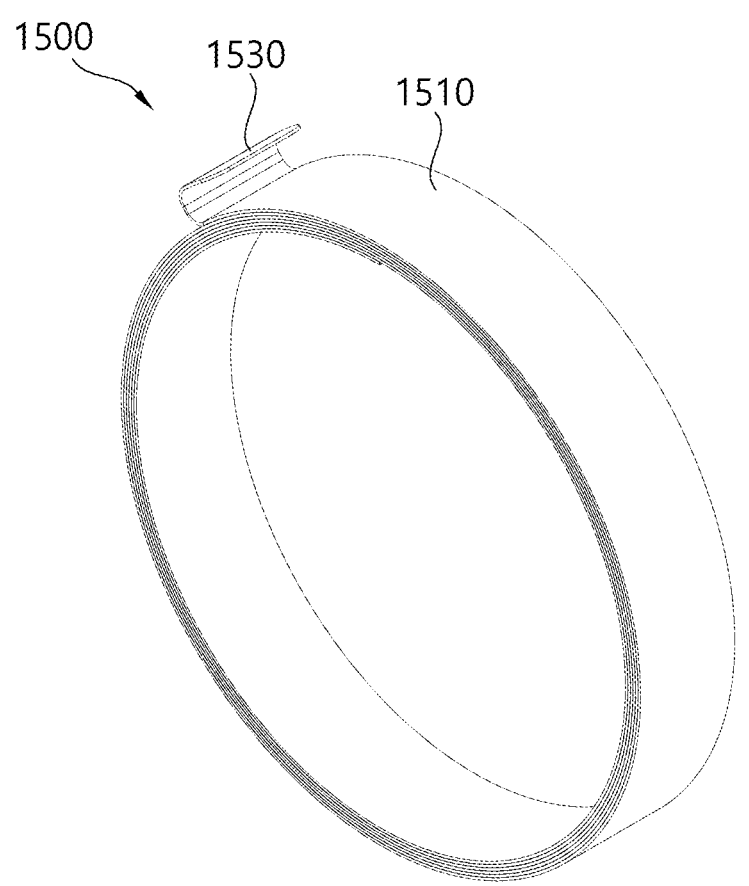
FIG. 19 is a perspective view of the elastic unit shown in FIG. 12.
Figure 20:
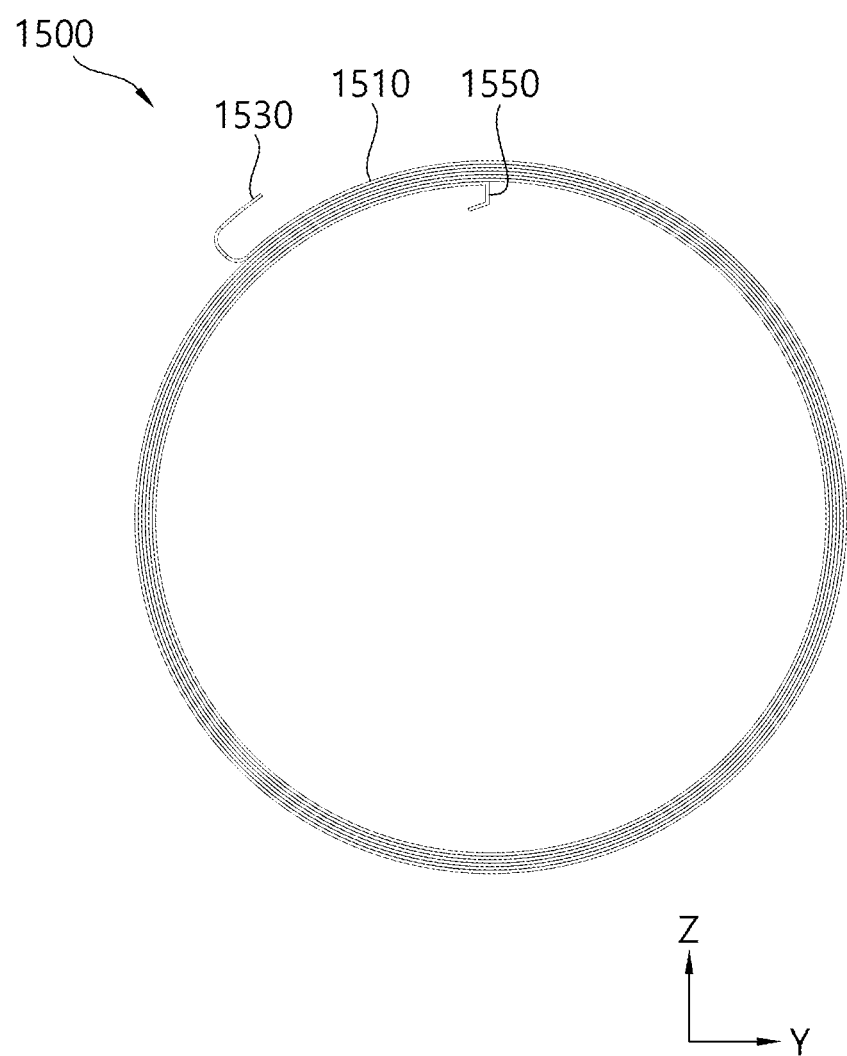
FIG. 20 is a front view of the elastic unit shown in FIG. 19.
Figure 22:
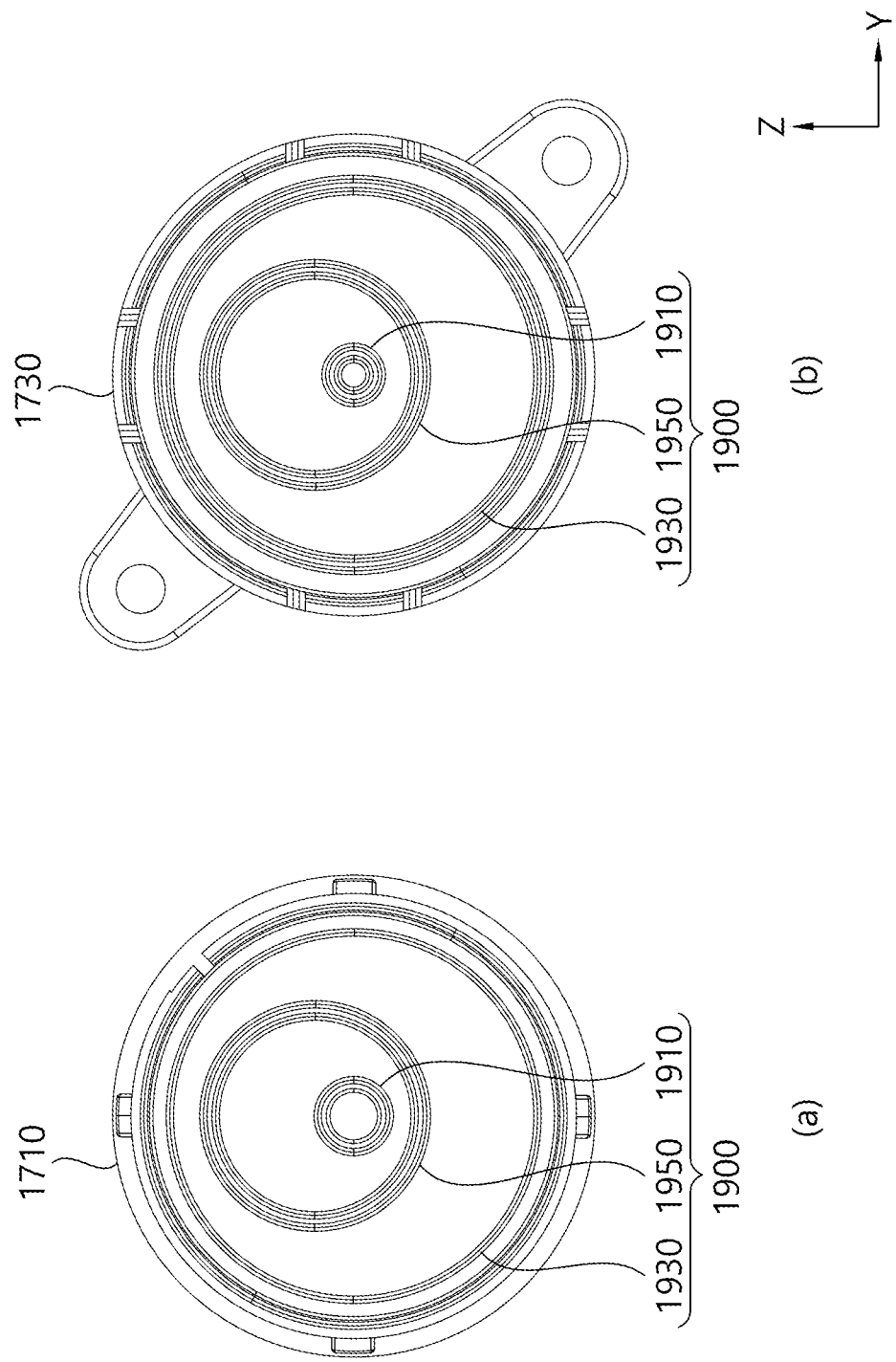
FIG. 22 is a front view of the inside of the first casing and the second casing of the shaft assembly according to the first embodiment of the present disclosure.

FIG. 18 is a cross-sectional view along line XVIII-XVIII shown in FIG. 14. FIG. 19 is a perspective view of the elastic unit shown in FIG. 12. FIG. 20 is a front view of the elastic unit shown in FIG. 19. FIG. 21 is an enlarged view of region G shown in FIG. 18. FIG. 22 is a front view of the inside of the first casing and the second casing of the shaft assembly according to the first embodiment of the present disclosure.

As shown in FIGS. 18 to 22, the elastic unit 1500 is connected to any one of a plurality of gears of the gear unit 1400, and the gear unit 1400 provides an elastic force so that the gear unit 1400 provides a rotational driving force to the shaft 1100 between a deployed position and a retracted position of the blind sheet 12. One side of the elastic unit 1500 is connected to the second gear 1430 and the other side is connected to the casing 1700, and includes a spring type plate spring elastically deformed according to the rotational movement of the second gear 1430.

The elastic unit 1500 includes an elastic body 1510 disposed between the second gear 1430 and the casing 1700 and elastically deforming to provide elastic force to the second gear 1430, a first connection portion 1510 bent and extended from an end of an outer circumference of the elastic body 1510, and a second connection portion 1530 bent and extended from an end of an inner circumference of the elastic body 1510. Herein, the first connection portion 1510 is connected to a casing hooking portion 1733 of the second gear 1430, which will be described later, and the second connection portion 1530 is connected to the gear hooking portion 1437.

The casing 1700 accommodates the gear unit 1400 and the elastic unit 1500 and is selectively coupled to and separated from either one of the pair of end caps 1200. In an embodiment of the present disclosure, the casing 1700 is selectively coupled to and separated from the second end cap 1230. In an embodiment of the present disclosure, the casing 1700 forms an accommodation space of the gear unit 1400 and the elastic unit 1500 and includes a first casing 1710 and a second casing 1730 that are detachably coupled to each other.

The first casing 1710 includes a first casing body 1711 and a penetration hole 1713 formed in the center of the first casing body 1711. The penetration hole 1713 is formed so that the gear rotation axis 1413 of the first gear 1410 protrudes, or is formed so that the second end cap 1230 is inserted when a rotation axis is formed in the second end cap 1230. In an embodiment of the present disclosure, the gear rotation axis 1413 of the first gear 1410 coupled to the second end cap 1230 penetrates through the penetration hole 1713 and protrudes.

The second casing 1730 includes a second casing body 1731 and a casing hooking portion 1733 formed on an outer circumference of the second casing body 1731. The casing hooking part 1733 is formed so that the first connection portion 1510 of the elastic unit 1500 is hooked and coupled.

The guide portion 1900 is formed on the inner surfaces of each of the first casing 1710 and the second casing 1730, prevents the first gear 1410, the second gear 1430, and the third gear 1450 from deviation of each rotation axis during rotational movement, and guides the rotational movement of the first gear 1410, the second gear 1430, and the third gear 1450.

The guide portion 1900 includes the first guide portion 1910, the second guide portion 1930, and the third guide portion 1950. The first guide portion 1910 guides the rotational movement of the first gear 1410 and limits deviation of the first gear 1410 from a rotation axis of the first gear 1410. The second guide portion 1930 forms a concentric circle with the first guide portion 1910, guides the rotational movement of the second gear 1430, and limits deviation of the second gear 1430 from a rotation axis of the second gear 1430. The third guide portion 1950 has a separate circular shape and is disposed between the first guide portion 1910 and the second guide portion 1930, guides the rotational movement of the third gear 1450, and limits deviation of the third gear 1450 from a rotation axis of the third gear 1450.

Second Embodiment

Figure 23:
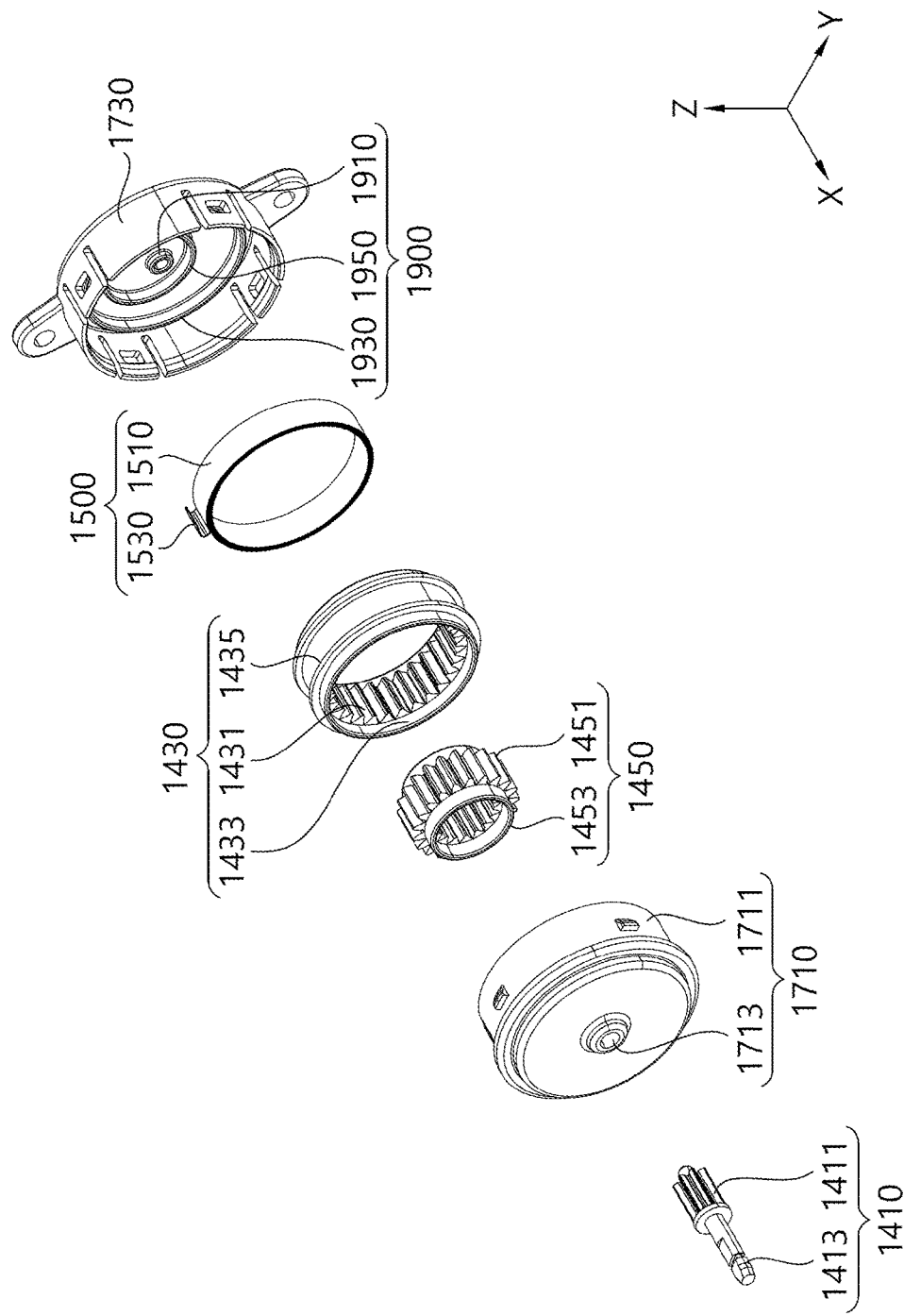
FIG. 23 is a partial exploded view (gear unit, elastic unit and casing) of the shaft assembly according to the second embodiment of the present disclosure.
Figure 24:
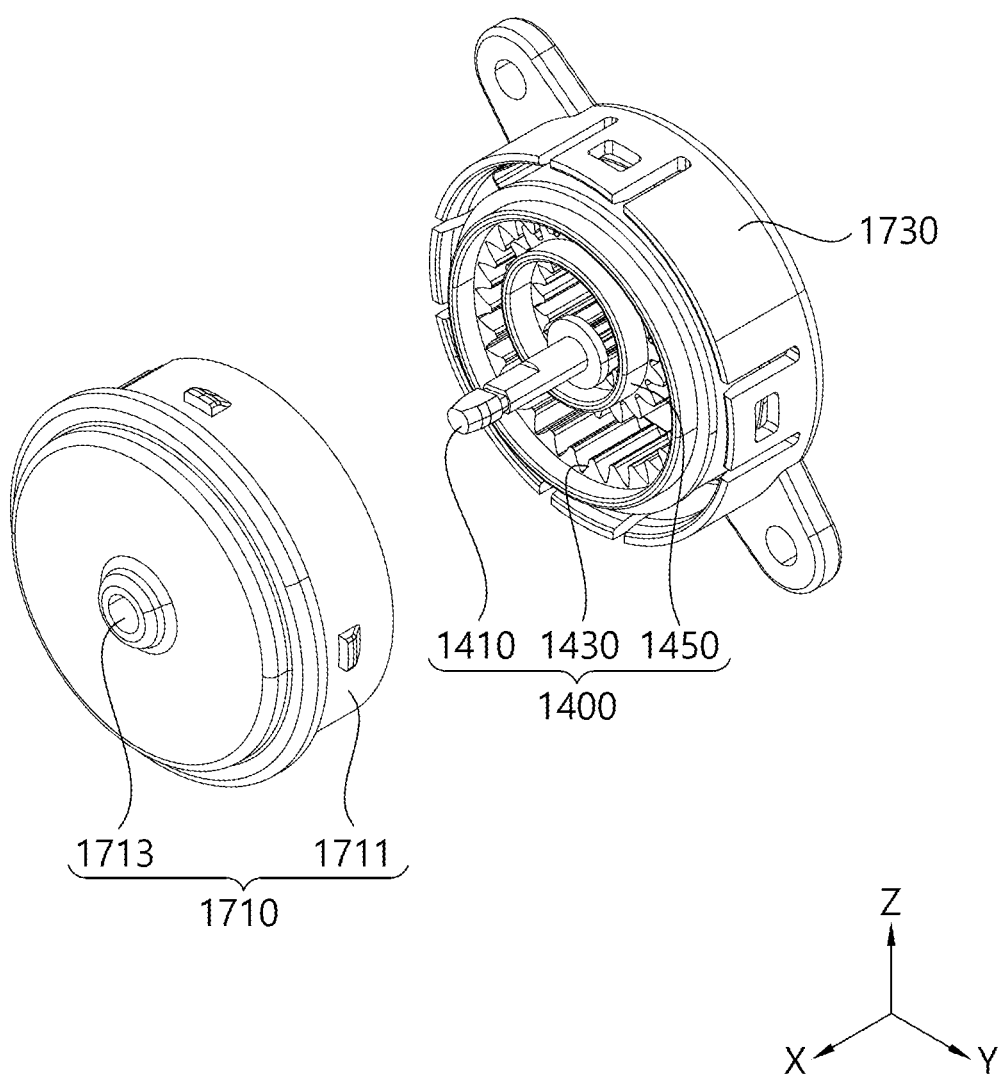
FIG. 24 is a perspective view in which the gear unit and the elastic unit shown in FIG. 23 are accommodated in a second casing and the first casing is disassembled.
Figure 25:
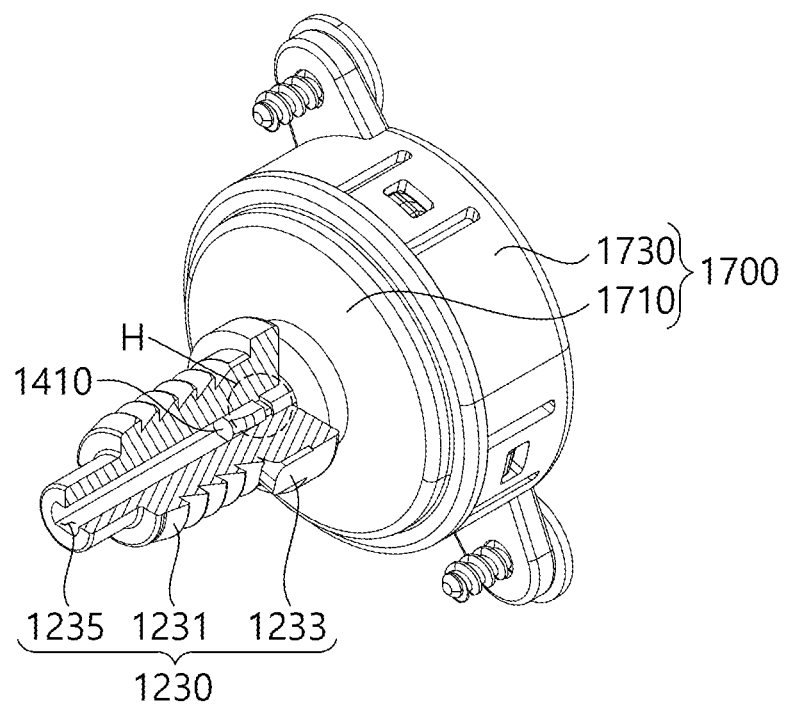
FIG. 25 is a cutaway perspective view in which the second end cap and the gear unit of the shaft assembly according to the second embodiment of the present disclosure are coupled.
Figure 26:
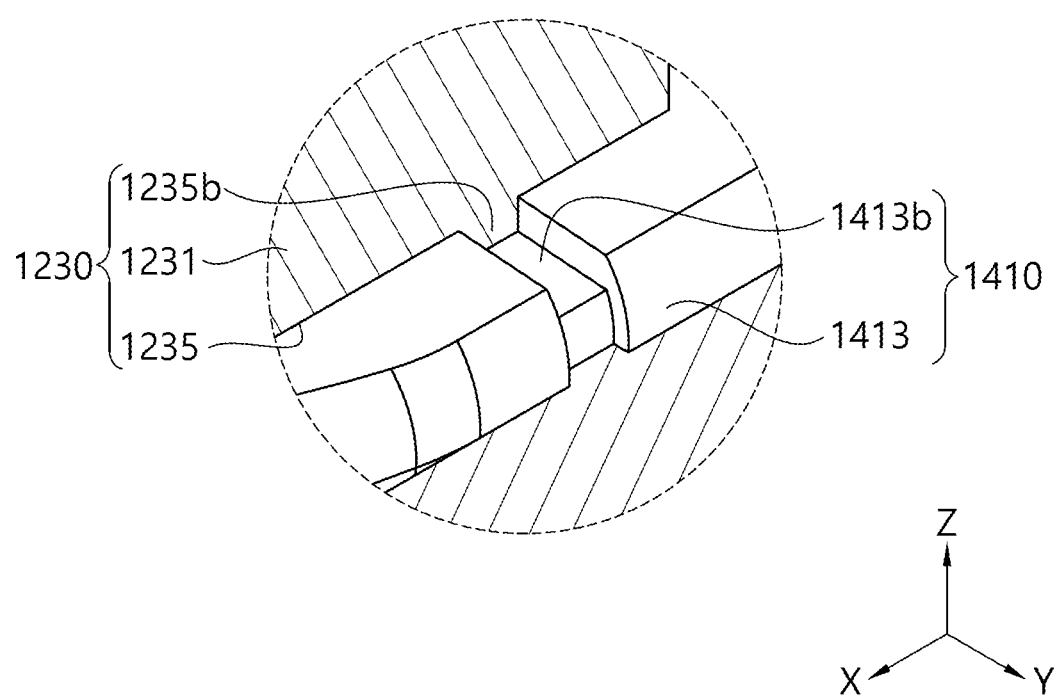
FIG. 26 is an enlarged view of region H shown in FIG. 25.
Figure 27:
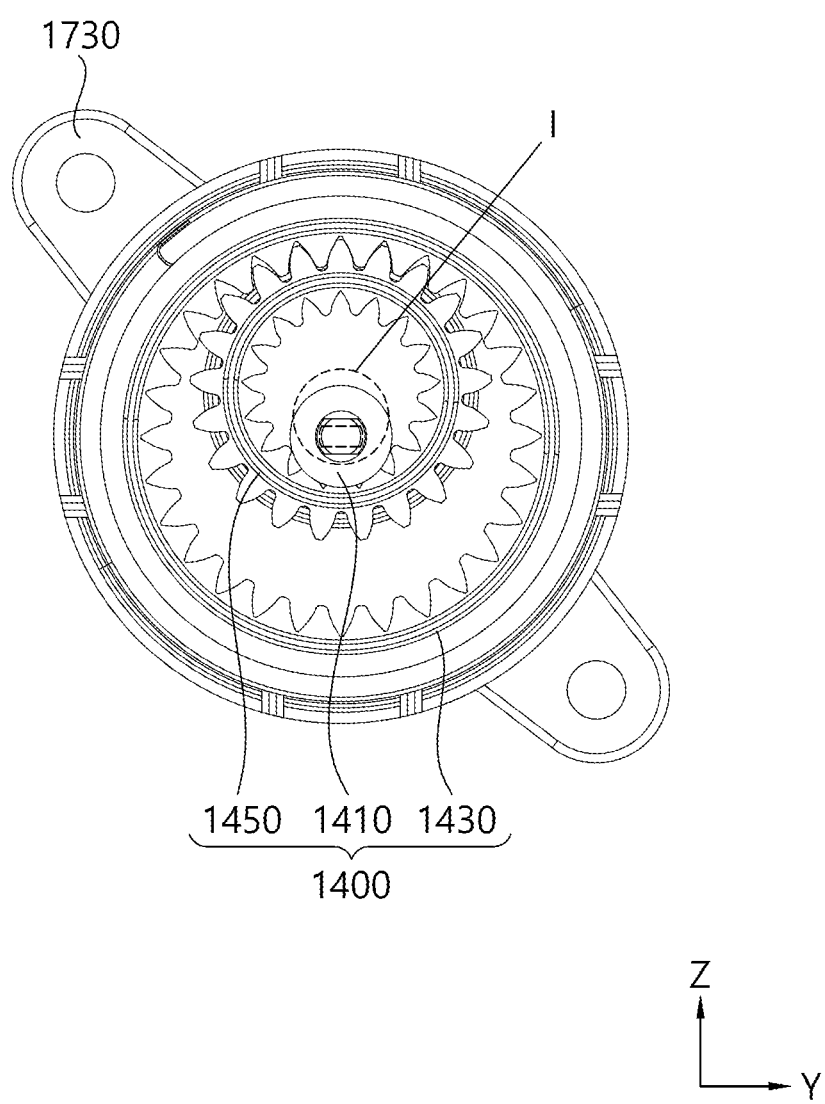
FIG. 27 is a front view of a gear unit and an elastic unit accommodated in the second casing shown in FIG. 24.
Figure 28:
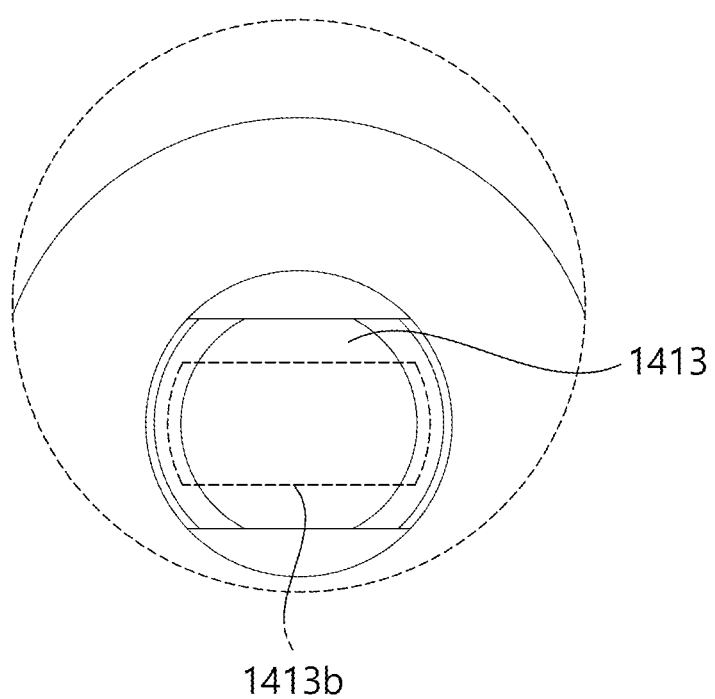
FIG. 28 is an enlarged view of region I shown in FIG. 27.

FIG. 23 is a partial exploded view (gear unit, elastic unit and casing) of the shaft assembly according to the second embodiment of the present disclosure. FIG. 24 is a perspective view in which the gear unit and the elastic unit shown in FIG. 23 are accommodated in a second casing and the first casing is disassembled. FIG. 25 is a cutaway perspective view in which the second end cap and the gear unit of the shaft assembly according to the second embodiment of the present disclosure are coupled. FIG. 26 is an enlarged view of region H shown in FIG. 25. FIG. 27 is a front view of a gear unit and an elastic unit accommodated in the second casing shown in FIG. 24. FIG. 28 is an enlarged view of region I shown in FIG. 27.

As shown in FIGS. 23 to 28, the shaft assembly 1000 according to the second embodiment of the present disclosure includes the shaft 1100, the pair of end caps 1200, the gear unit 1400, and an elastic unit 1500. In addition, the shaft assembly 1000 according to the second embodiment of the present disclosure further includes the casing 1700 and the guide portion 1900. The shaft assembly 1000 according to the second embodiment of the present disclosure may be used for the apparatus 1 for shading a window of an automobile used for the rear window and the apparatus 1 for shading a window of an automobile used for the side window, like the shaft assembly 1000 according to the first embodiment of the present disclosure. In addition, it should be noted that the shaft assembly 1000 according to the second embodiment of the present disclosure may be applied to the apparatus 1 for shading a window of an automobile that automatically and manually reciprocates the blind sheet 12.

Herein, the shaft 1100, the elastic unit 1500, the casing 1700, and the guide portion 1900 of the shaft assembly 1000 according to the second embodiment of the present disclosure are the same as the shaft 1100, the elastic unit 1500, the casing 1700, and the guide portion 1900 of the shaft assembly 1000 according to the first embodiment of the present disclosure, and thus are omitted hereinafter.

The pair of end caps 1200 include the first end cap 1210 and the second end cap 1230. The first end cap 1210 is the same as the first end cap 1210 described in the first embodiment of the present disclosure, and thus is omitted hereinafter.

In an embodiment of the present disclosure, the second end cap 1230 includes the second cap body 1231, the second notch coupling portion 1233, and the end cap penetration portion 1235. Herein, the end cap penetration portion 1235 of the second end cap 1230 is formed to be coupled with a gear rotation axis 1413 of a first gear 1410, but the second end cap 1230 may include an end cap rotation axis corresponding to an unshown gear penetration portion of the first gear 1410. In other words, the second end cap 1230 may include the end cap penetration portion 1235 when the first gear 1410 has the gear rotation axis 1413, and may include the end cap rotation axis when the first gear 1410 has the gear penetration portion. In detail, the end cap penetration portion 1235 of the second end cap 1230 and the end cap rotation axis may correspond to the first gear 1410 and be used alternately.

In the second embodiment of the present disclosure, unlike the first embodiment of the present disclosure, a projection 1235*b* is formed in the end cap penetration portion 1235. The projection 1235*b* formed in the end cap penetration portion 1235 engages with a recessed portion 1413*b* of the first gear 1410, which will be described later, to limit the relative rotational movement between the end cap penetration portion 1235 and the first gear 1410.

The gear unit 1400 includes the first gear 1410, the second gear 1430, and the third gear 1450. Herein, the second gear 1430 and the third gear 1450 are the same as the second gear 1430 and the third gear 1450 of the first embodiment of the present disclosure, and thus are omitted hereinafter.

The first gear 1410 of the second embodiment of the present disclosure is coupled to the second end cap 1230 of the pair of end caps 1200. The first gear 1410 interlocks with the rotational movement of the shaft 1100 between a retracted position and a deployed position of the blind sheet 12 and provides a rotational movement force to the shaft 1100 between the deployed position and the retracted position of the blind sheet 12. The first gear 1410 includes a first gear body 1411 and the gear rotation axis 1413.

The first gear body 1411 is meshed with the third gear 1450. Gear teeth meshed with the third gear 1450 of the first gear body 1411 are formed along a circumference of an outer circumferential surface. The first gear body 1411 is prevented from being deviated from a rotation axis of the first gear body 1411 by the first guide portion 1910 of the guide portion 1900 to be described later.

In an embodiment of the present disclosure, the gear rotation axis 1413 is provided to be inserted into and coupled to the end cap penetration portion 1235. Herein, the gear rotation axis 1413 may be formed as an unshown gear penetration portion and coupled to an unshown end cap rotation axis. In other words, rotation axes and penetration portions may be alternately formed in the second end cap 1230 and the first gear 1410.

The gear rotation axis 1413 has the recessed portion 1413*b* that is recessed from the surface and engages with the projection 1235*b* of the end cap penetration portion 1235 to limit relative rotational movement between the second end cap 1230 and the first gear 1410. In detail, the recessed portion of the first gear 1410 engages with the projection 1235*b* of the end cap penetration portion 1235 serving as a key to limit relative rotational movement between the second end cap 1230 and the first gear 1410.

Figure 29:
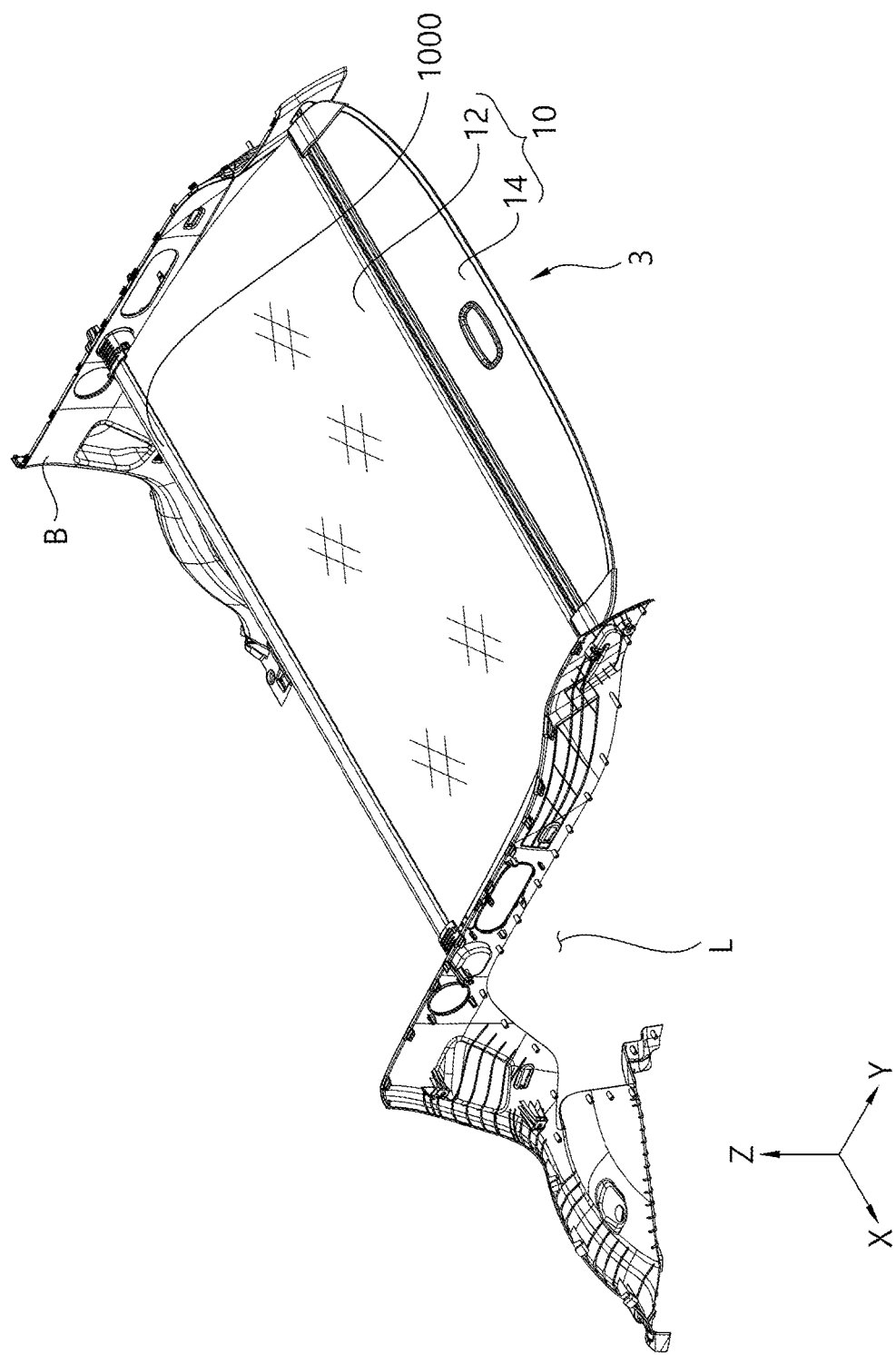
FIG. 29 is a perspective view of an apparatus for a luggage screen of an automobile including the shaft assembly according to the first and second embodiments of the present disclosure.

FIG. 29 is a perspective view of an apparatus for a luggage screen of an automobile including the shaft assembly according to the first and second embodiments of the present disclosure. FIG. 30 is an exploded perspective view of the apparatus for a luggage screen of an automobile shown in FIG. 29.

As shown in FIGS. 29 and 30, an apparatus 3 for a luggage screen of an automobile having the shaft assembly 1000 according to the first and second embodiment of the present disclosure includes the blind unit 10 and the shaft assembly 1000. The apparatus 3 for a luggage screen is disposed on a body B, specifically a body B in which a trunk is formed. The apparatus 3 for a luggage screen selectively screens a cargo loading space L.

The blind unit 10 includes the blind sheet 12 and the shade bar 14. The blind sheet 12 reciprocates between a deployed position that screens the cargo loading space L and a retracted position that releases the screen of the cargo loading space L. One side of the blind sheet 12 is connected to the shade bar 14, and the other side is connected to the shaft assembly 1000. The blind sheet 12 is retracted around the shaft assembly 1000 in the retracted position that releases the screen of the cargo loading space L and is made of a flexible material such as fabric to be deployed to a deployed position that screens the cargo loading space L.

The shade bar 14 is connected to one side of the blind sheet 12 facing the shaft assembly 1000. The shade bar 14 is disposed to pull the blind sheet 12 from a retracted position to a deployed position.

As the shaft assembly 1000 included in the apparatus 3 for a luggage screen, any one of the shaft assemblies 1000 according to the first and second embodiments of the present disclosure is used. The detailed configuration of the shaft assembly 1000 is the same as that of the shaft assembly 1000 according to the first and second embodiments described above, and thus is omitted hereinafter.

In this regard, the shaft can perform rotational movement according to the rotational movement of the gear unit by including the gear unit that elastically deforms the elastic unit according to the rotational movement force transmitted from the shaft when moving from the retracted position to the deployed position of the blind sheet, and providing elastic force to the gear unit when moving from the deployed position to the retracted position of the blind sheet, thereby improving the operation reliability of the shaft involved in the reciprocation of the blind sheet.

In addition, unlike the conventional method of providing elastic force to the shaft by using a torsion spring between a pair of end caps disposed on both ends of the shaft, since the gear unit and the elastic unit connected to either one of the pair of end caps can provide elastic force for rotational movement of the shaft, compared to conventional torsion springs, noise generation is minimized and the use of subsidiary materials is minimized, thereby improving product satisfaction and reducing assembly process time.

Although the exemplary embodiments of the present disclosure are described above in detail with reference to the accompanying drawings, it would be understood by those skilled in the technical field to which the present disclosure pertains that the present disclosure may be embodied in other specific forms without changing technical ideas or essential features of the present disclosure. Thus, it is clear that the aforementioned embodiments are illustrative in all aspects and do not limit the present disclosure. The scope of the present disclosure is defined by the following claims rather than by the detailed description. It shall be understood that all modifications and embodiments conceived from the meaning and scope of the claims and their equivalents are included in the scope of the present disclosure.

DESCRIPTION OF REFERENCE NUMERALS

| 1: | Apparatus for shading a window | 3: | Apparatus for a luggage screen |
|---|---|---|---|
| 12: | Blind sheet | 19: | Frame |
| 1000: | Shaft assembly | 1100: | Shaft |
| 1130: | Notch portion | 1200: | End cap |
| 1210: | First end cap | 1213: | First notch coupling portion |
| 1230: | Second end cap | 1233: | Second notch coupling portion |
| 1235: | End cap penetration portion | 1235a: | Groove |
| 1235b: | Projection | 1400: | Gear unit |
| 1410: | First gear | 1413: | Gear rotation axis |
| 1413a: | Protrusion portion | 1413b: | Recessed portion |
| 1430: | Second gear | 1435: | Rib |
| 1437: | Gear hooking portion | 1500: | Elastic unit |
| 1700: | Casing | 1710: | First casing |
| 1730: | Second casing | 1733: | Casing hooking portion |
| 1900: | Guide portion | 1910: | First guide portion |
| 1930: | Second guide portion | 1950: | Third guide portion |

What is claimed is:

1. A shaft assembly, including:
a shaft connected to a blind sheet and performing rotational movement between a deployed position and a retracted position of the blind sheet;
a pair of end caps each being coupled to one side and the other side of the shaft to perform the rotational movement together with the shaft;
a gear unit connected to either one of the pair of end caps, the gear unit having a plurality of gears to interlock with the rotational movement of the shaft between the retracted position and the deployed position of the blind sheet and providing the shaft with a rotational movement force between the deployed position and the retracted position of the blind sheet; and
an elastic unit connected to any one of the plurality of gears of the gear unit and providing an elastic force so that the gear unit provides a rotational driving force to the shaft between the deployed position and the retracted position of the blind sheet, wherein the gear unit includes:
a first gear connected to either one of the pair of end caps to interlock with the rotational movement of the shaft between the retracted position and the deployed position of the blind sheet and provide the shaft with the rotational movement force between the deployed position and the retracted position of the blind sheet;
a ring-shaped second gear disposed with the first gear at a center of the second gear and connected to the elastic unit to interlock with the rotational movement of the first gear and provide the rotational driving force to the first gear according to the elastic force provided from the elastic unit; and
a ring-shaped third gear disposed in a space between the first gear and the second gear and meshed with the first gear and the second gear, and performing the rotational movement so as to selectively transmit the rotational movement force provided from the first gear to the second gear and transmit the rotational movement force provided from the second gear to the first gear,
wherein the third gear transmits the rotational movement force according to the rotational movement of the first gear to the second gear between the retracted position and the deployed position of the blind sheet, and transmits the rotational movement force of the second gear, which performs the rotational movement by the elastic force provided from the elastic unit, to the first gear between the deployed position and the retracted position of the blind sheet,
wherein the shaft assembly further includes a casing that accommodates the gear unit and the elastic unit and is selectively coupled to and separated from either one of the pair of end caps, and
wherein the elastic unit includes a plate spring having an inner circumferential surface connected to the second gear and an outer circumferential surface connected to the casing and elastically deformed according to the rotational movement of the second gear and disposed between the casing and the second gear.

2. The shaft assembly of claim 1, wherein the third gear is disposed as a planetary gear smaller in diameter than the second gear between the first gear and the second gear.

3. The shaft assembly of claim 1, wherein:
the first gear coupled to either one of the pair of end caps includes either one of a gear rotation axis and a gear penetration portion; and
either one of the pair of end caps coupled to the first gear includes either one of an end cap penetration portion and an end cap rotation axis corresponding to either one of the gear rotation axis and the gear penetration portion and coupled to either the gear rotation axis or the gear penetration portion.

4. The shaft assembly of claim 3, wherein either one of a protrusion portion protruding from a surface and a recessed portion recessed from the surface is formed on the gear rotation axis, and either one of a groove and a projection is formed in the end cap penetration portion to limit a relative rotational movement between the gear rotation axis and the end cap penetration portion by being engaged with either one of the protrusion portion and the recessed portion.

5. The shaft assembly of claim 3, wherein either one of a projection protruding from a surface and a groove recessed from the surface is formed on the end cap rotation axis, and either one of the recessed portion and the protrusion portion is formed in the gear penetration portion to limit a relative rotational movement between the end cap rotation axis and the gear penetration portion by being engaged with either one of the projection and the groove.

6. The shaft assembly of claim 1, wherein:
the casing includes a first casing and a second casing that form an accommodation space of the gear unit and the elastic unit and are detachably coupled to each other; and
inner surfaces of the first casing and the second casing have a guide portion formed thereon, wherein the guide portion prevents the first gear, the second gear, and the third gear from being deviated from their respective rotational axes during the rotational movement, and guides the rotational movement of the first gear, the second gear, and the third gear.

7. The shaft assembly of claim 6, wherein the guide portion includes:
a first guide portion for guiding the rotational movement of the first gear and limiting deviation of the first gear from a rotation axis of the first gear;
a second guide portion for forming a concentric circle with the first guide portion, guiding the rotational movement of the second gear, and limiting the deviation of the second gear from a rotation axis of the second gear; and
a third guide portion disposed in a separate circular shape between the first guide portion and the second guide portion, guiding the rotational movement of the third gear, and limiting the deviation of the third gear from a rotation axis of the third gear.

8. The shaft assembly of claim 1, wherein the elastic unit is disposed between an outer circumferential surface of the second gear and an inner circumferential surface of the casing, and
wherein the second gear includes a rib which extends from the outer circumferential surface of the second gear toward an inner surface of the casing to limit the deviation of the elastic unit.

9. The shaft assembly of claim 1, wherein both sides of the shaft includes a partially recessed notch portion, and the pair of end caps includes a notch coupling portion engaged with the notch portion to limit relative rotational movement between the end caps and the shaft.

10. An apparatus for shading a window of an automobile, the apparatus including:
a blind sheet selectively shading the window of the automobile; and
the shaft assembly of claim 1 having one side connected to the blind sheet to reciprocate the blind sheet between a deployed position in which the blind sheet shades the window and a retracted position that unshades the window.

11. The apparatus of claim 10, further including a frame supporting the shaft assembly to either one of a door panel and a vehicle body of the automobile, and having one side supporting rotational movement of either one of a pair of end caps and the other side supporting a connection between the other one of the pair of end caps and the gear unit.

12. An apparatus for luggage screen of an automobile, the apparatus including:
a blind sheet selectively screening a cargo loading space of the automobile; and
the shaft assembly of claim 1 disposed in the cargo loading space and having one side connected to the blind sheet to reciprocate the blind sheet between a deployed position in which the blind sheet screens the cargo loading space and a retracted position in which the screen in the cargo loading space is released.

13. The shaft assembly of claim 1, wherein the casing is configured to limit movement of the elastic unit.

* * * * *